United States Patent
Wu

(10) Patent No.: US 12,440,751 B2
(45) Date of Patent: Oct. 14, 2025

(54) PICTURE UPDATE METHOD AND APPARATUS, COMPUTER DEVICE, AND STORAGE MEDIUM

(71) Applicant: Tencent Technology (Shenzhen) Company Limited, Shenzhen (CN)

(72) Inventor: Jiaping Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 640 days.

(21) Appl. No.: 17/732,386

(22) Filed: Apr. 28, 2022

(65) Prior Publication Data

US 2022/0249945 A1  Aug. 11, 2022

Related U.S. Application Data

(63) Continuation of application No. PCT/CN2021/100301, filed on Jun. 16, 2021.

(30) Foreign Application Priority Data

Jul. 27, 2020 (CN) .......................... 202010731481.9

(51) Int. Cl.
A63F 13/211 (2014.01)
A63F 13/24 (2014.01)
(Continued)

(52) U.S. Cl.
CPC ............ *A63F 13/211* (2014.09); *A63F 13/24* (2014.09); *A63F 13/40* (2014.09);
(Continued)

(58) Field of Classification Search
CPC ........ A63F 13/211; A63F 13/24; A63F 13/40; A63F 2300/105; A63F 2300/1043;
(Continued)

(56) References Cited

U.S. PATENT DOCUMENTS

| 6,112,267 A | * | 8/2000 | McCormack | ........... G06F 12/08 |
| | | | | 711/119 |
| 8,934,887 B2 | * | 1/2015 | Dgani | ................... G06F 13/107 |
| | | | | 455/418 |

(Continued)

FOREIGN PATENT DOCUMENTS

| CN | 101890237 A | 11/2010 |
| CN | 107111340 A | 8/2017 |

(Continued)

OTHER PUBLICATIONS

Tencent Technology, WO, PCT/CN2021/100301, Aug. 26, 2021, 5 pgs.

(Continued)

*Primary Examiner* — Steven J Hylinski
(74) *Attorney, Agent, or Firm* — Morgan, Lewis & Bockius LLP

(57) ABSTRACT

This application relates to a picture update method and apparatus, a computer device, and a storage medium. The method includes: receiving sensor data sent by a terminal, the sensor data being collected by a physical sensor of the terminal; writing the sensor data into a virtual sensor, the virtual sensor corresponding to a structure of the physical sensor and is configured to support a sensor service associated with the physical sensor; reading the sensor data in the virtual sensor, updating a multimedia picture based on the sensor data, and generating corresponding updated multimedia data; and returning the updated multimedia data to the terminal, so that the terminal displays the corresponding updated multimedia picture based on the updated multimedia data.

19 Claims, 10 Drawing Sheets

(51) Int. Cl.
*A63F 13/40* (2014.01)
*G06F 9/455* (2018.01)

(52) U.S. Cl.
CPC . *A63F 2300/1043* (2013.01); *A63F 2300/105* (2013.01); *G05B 2219/37537* (2013.01); *G06F 9/45558* (2013.01); *G06F 2009/45562* (2013.01)

(58) Field of Classification Search
CPC ...... G05B 23/0221; G05B 2219/37537; G06F 9/45558; G06F 2009/45562
See application file for complete search history.

(56) References Cited

U.S. PATENT DOCUMENTS

| | | | | |
|---|---|---|---|---|
| 2004/0133398 | A1* | 7/2004 | Merkin | G06F 11/3058 702/188 |
| 2006/0212872 | A1* | 9/2006 | Raghunath | H04W 88/02 718/105 |
| 2011/0138016 | A1* | 6/2011 | Jung | H04L 67/01 709/219 |
| 2013/0159223 | A1* | 6/2013 | Bahl | G06N 5/04 706/46 |
| 2014/0025338 | A1* | 1/2014 | Blount | G05B 23/0221 702/183 |
| 2016/0150368 | A1* | 5/2016 | Wouhaybi | H04W 4/029 455/456.1 |
| 2018/0089347 | A1* | 3/2018 | Yim | G06F 9/45533 |
| 2018/0306609 | A1* | 10/2018 | Agarwal | G06N 20/10 |
| 2020/0033163 | A1* | 1/2020 | Agarwal | G06N 20/00 |
| 2022/0164973 | A1* | 5/2022 | Lee | G06T 7/55 |

FOREIGN PATENT DOCUMENTS

| | | | | |
|---|---|---|---|---|
| CN | 107577542 | A | 1/2018 | |
| CN | 107621999 | A | 1/2018 | |
| CN | 108958930 | A * | 12/2018 | G06F 9/5005 |
| CN | 110300909 | A | 10/2019 | |
| CN | 110585699 | A | 12/2019 | |
| CN | 111111163 | A | 5/2020 | |
| CN | 111309445 | A | 6/2020 | |
| CN | 111744189 | A | 10/2020 | |
| EP | 3657329 | A1 * | 5/2020 | G06F 9/4856 |
| EP | 3696636 | A1 * | 8/2020 | |
| JP | 2012239777 | A | 12/2012 | |
| KR | 20100138827 | A | 12/2010 | |
| KR | 20150034950 | A | 4/2015 | |
| WO | WO 2012053272 | A1 | 4/2012 | |
| WO | WO-2012094424 | A1 * | 7/2012 | H04W 4/00 |

OTHER PUBLICATIONS

Tencent Technology, Iprp, PCT/CN2021/100301, Jan. 31, 2023, 6 pgs.
Tencent Technology, European Office Action, EP Patent Application No. 21849984.6, Dec. 19, 2023, 6 pgs.
Tencent Technology, Indian Office Action, IN Patent Application No. 202247026437, Mar. 11, 2024, 8 pgs.
Tencent Technology, ISR, PCT/CN2021/100301, Aug. 26, 2021, 3 pgs.
Hillol Debnath et al., "Sentio: Distributed Sensor Virtualization for Mobile Apps", 2018 IEEE International Conference on Pervasive Computing and Communications (PERCOM), IEEE, Mar. 19, 2018, XP033391442, 9 pgs.
Hamzeh Khazaei et al., "Elascale: Autoscaling and Monitoring as a Service", arxiv.org, Cornell University Library, Nov. 9, 2017, XP081286639, 7 pgs.
Tencent Technology, Extended European Search Report, EP21849984.6, Dec. 12, 2022, 12 pgs.
Tencent Technology, Korean Office Action, KR Patent Application No. 10-2022- 7017512, Apr. 16, 2024, 10 pgs.

* cited by examiner

PICTURE UPDATE METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/100301, entitled "IMAGE UPDATE METHOD AND APPARATUS, COMPUTER DEVICE, AND STORAGE MEDIUM" filed on Jun. 16, 2021, which claims priority to Chinese Patent Application No. 202010731481.9, filed with the State Intellectual Property Office of the People's Republic of China on Jul. 27, 2020, and entitled "PICTURE UPDATE METHOD AND APPARATUS, COMPUTER DEVICE, AND STORAGE MEDIUM", all of which are incorporated herein by reference in their entirety.

FIELD OF THE TECHNOLOGY

This application relates to the field of computer technology, and in particular, to a picture update method and apparatus, a computer device, and a storage medium.

BACKGROUND OF THE DISCLOSURE

With the development of computer technology, an application may run on a server without being installed or run on a terminal. For example, cloud gaming is a game mode based on cloud computing. In a running mode of the cloud gaming, all games are run on a server. The server compresses a rendered game picture and transmits the compressed game picture to a terminal over a network.

In conventional technology, an application that runs on the terminal usually detects an act of a user by using a physical sensor, so as to update the picture displayed on the terminal. For example, a local game that runs on the terminal detects an act of shake of the user through an acceleration sensor in the terminal, thereby implementing movement of the game picture.

However, because the application runs on the server and the server contains no physical sensor, the picture displayed on the terminal is unable to be updated by detecting the act of the user.

SUMMARY

A picture update method is provided, the method including:

receiving sensor data sent by a terminal, the sensor data being collected by a physical sensor of the terminal;

writing the sensor data into a virtual sensor, the virtual sensor corresponding to a structure of the physical sensor and is configured to support a sensor service associated with the physical sensor;

reading the sensor data in the virtual sensor, updating a multimedia picture based on the sensor data, and generating corresponding updated multimedia data; and returning the updated multimedia data to the terminal, so that the terminal displays an updated multimedia picture based on the updated multimedia data.

In an embodiment, generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status, include:

reading the current switch status statistics list in the shared memory, and generating a corresponding physical sensor control instruction, the physical sensor control instruction carrying the current switch status statistics list; returning the physical sensor control instruction to the terminal, so that the terminal obtains a historical switch status statistics list based on the physical sensor control instruction, and updates the switch status of the corresponding target physical sensor based on a difference between the historical switch status statistics list and the current switch status statistics list.

A picture update apparatus is provided, the apparatus including:

a sensor data receiving module, configured to receive sensor data sent by a terminal, the sensor data being collected by a physical sensor of the terminal;

a sensor data writing module, configured to write the sensor data into a virtual sensor, the virtual sensor corresponding to a structure of the physical sensor and is configured to support a sensor service;

a multimedia data generating module, configured to read the sensor data in the virtual sensor, update a multimedia picture based on the sensor data, and generate corresponding updated multimedia data; and a multimedia data transmitting module, configured to return the updated multimedia data to the terminal, so that the terminal displays the corresponding updated multimedia picture based on the updated multimedia data.

A computer device is provided, including a memory and a processor. The memory stores a computer-readable instruction. When executed by the processor, the computer-readable instruction implements the following steps:

receiving sensor data sent by a terminal, the sensor data being collected by a physical sensor of the terminal;

writing the sensor data into a virtual sensor, the virtual sensor corresponding to a structure of the physical sensor and is configured to support a sensor service;

reading the sensor data in the virtual sensor, updating a multimedia picture based on the sensor data, and generating corresponding updated multimedia data; and returning the updated multimedia data to the terminal, so that the terminal displays the corresponding updated multimedia picture based on the updated multimedia data.

A computer-readable storage medium is provided. The computer-readable storage medium stores a computer-readable instruction. When executed by a processor, the computer-readable instruction implements the following steps:

receiving sensor data sent by a terminal, the sensor data being collected by a physical sensor of the terminal;

writing the sensor data into a virtual sensor, the virtual sensor corresponding to a structure of the physical sensor and is configured to support a sensor service;

reading the sensor data in the virtual sensor, updating a multimedia picture based on the sensor data, and generating corresponding updated multimedia data; and returning the updated multimedia data to the terminal, so that the terminal displays the corresponding updated multimedia picture based on the updated multimedia data.

A picture update method is provided, the method including:

obtaining sensor data collected by a local physical sensor;

sending the sensor data to a server so that the server writes the sensor data into a virtual sensor through an application backend, reading the sensor data in the virtual sensor through an application, updating a multimedia picture based on the sensor data, and generating corresponding updated multimedia data through the application backend based on the updated multimedia picture, the virtual sensor corresponding to a structure of the physical sensor and is configured to support a sensor service;

receiving the updated multimedia data returned by the server; and displaying the corresponding updated multimedia picture based on the updated multimedia data.

A picture update apparatus is provided, the apparatus including:

a sensor data obtaining module, configured to obtain sensor data collected by a local physical sensor;

a sensor data transmitting module, configured to send the sensor data to a server so that the server writes the sensor data into a virtual sensor through an application backend, read the sensor data in the virtual sensor through an application, update a multimedia picture based on the sensor data, and generate corresponding updated multimedia data through the application backend based on the updated multimedia picture, the virtual sensor corresponding to a structure of the physical sensor and is configured to support a sensor service;

a multimedia data receiving module, configured to receive the updated multimedia data returned by the server; and a multimedia picture displaying module, configured to display the corresponding updated multimedia picture based on the updated multimedia data.

A computer device is provided, including a memory and a processor. The memory stores a computer-readable instruction. When executed by the processor, the computer-readable instruction implements the following steps:

obtaining sensor data collected by a local physical sensor;

sending the sensor data to a server so that the server writes the sensor data into a virtual sensor through an application backend, reading the sensor data in the virtual sensor through an application, updating a multimedia picture based on the sensor data, and generating corresponding updated multimedia data through the application backend based on the updated multimedia picture, the virtual sensor corresponding to a structure of the physical sensor and is configured to support a sensor service;

receiving the updated multimedia data returned by the server; and displaying the corresponding updated multimedia picture based on the updated multimedia data.

A computer-readable storage medium is provided. The computer-readable storage medium stores a computer-readable instruction. When executed by a processor, the computer-readable instruction implements the following steps:

obtaining sensor data collected by a local physical sensor;

sending the sensor data to a server so that the server writes the sensor data into a virtual sensor through an application backend, reading the sensor data in the virtual sensor through an application, updating a multimedia picture based on the sensor data, and generating corresponding updated multimedia data through the application backend based on the updated multimedia picture, the virtual sensor corresponding to a structure of the physical sensor and is configured to support a sensor service;

receiving the updated multimedia data returned by the server; and displaying the corresponding updated multimedia picture based on the updated multimedia data.

A computer program product or a computer program is provided. The computer program product or computer program includes a computer-readable instruction. The computer-readable instruction is stored in a computer-readable storage medium. A processor of the computer device reads the computer-readable instruction in the computer-readable storage medium. The processor executes the computer-readable instruction, so that the computer device performs steps of the picture update method.

BRIEF DESCRIPTION OF THE DRAWINGS

To describe the technical solutions in the embodiments of this application more clearly, the following outlines the drawings used in the embodiments. Evidently, the drawings outlined below are merely a part of embodiments of this application. A person skilled in the art may derive other drawings from such drawings without making any creative effort.

DESCRIPTION OF EMBODIMENTS

To make the objectives, technical solutions, and advantages of this application clearer, the following describes this application in further detail with reference to drawings and embodiments. Understandably, the specific embodiments described herein are merely intended to explain this application, but are not intended to limit this application.

Figure 1:
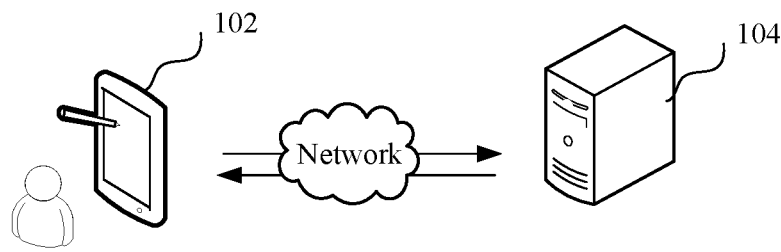
FIG. 1 is a diagram of an application environment of a picture update method according to an embodiment.

A picture update method according to this application is applicable to an environment shown in FIG. 1. In the drawing, a terminal 102 communicates with a server 104 over a network. The terminal 102 may collect sensor data through a local physical sensor, and send the data to the server 104. The server 104 may write the sensor data into a local virtual sensor. A structure of the virtual sensor in the server 104 corresponds to a structure of the physical sensor in the terminal 102. The virtual sensor may be configured to support a sensor service. The server 104 may read the sensor data in the virtual sensor, update a multimedia picture based on the sensor data, and generate corresponding updated multimedia data. The server 104 may send the updated multimedia data to the terminal 102. After receiving the updated multimedia data, the terminal 102 may locally display the updated multimedia picture corresponding to the updated multimedia data.

The terminal 102 may be, but is not limited to, various personal computers, notebook computers, smartphones, tablet computers, and portable wearable devices. The server 104 may be implemented in the form of a stand-alone server, or a server cluster formed of a plurality of servers, or a cloud server.

In the picture update method described above, the virtual sensor corresponding to the structure of the physical sensor is pre-constructed in the server. The virtual sensor may be configured to store the sensor data and support the sensor service. Therefore, in a scenario in which the application runs on a cloud server, even without a physical sensor, the server can still use the virtual sensor to start the sensor service to control the physical sensor of the terminal. The server can read the sensor data in the virtual sensor, the sensor data being collected by the physical sensor as triggered by a user operation and is sent by the terminal. The server updates the multimedia picture based on the sensor data, and generates the corresponding updated multimedia data. After receiving the updated multimedia data, the terminal can display the multimedia picture corresponding to the updated multimedia data. Finally, in this scenario, the picture displayed by the application on the terminal can still be updated by the physical sensor by detecting a user operation on the terminal.

Cloud gaming, also known as gaming on demand, is a type of online gaming technology based on cloud computing technology. Cloud gaming technology enables a thin client with relatively limited capabilities of graphic processing and data computing to run a high-quality game. In a cloud gaming scenario, a game is not run on a player's game terminal, but is run on a cloud server. The cloud server renders the gaming scenario into video and audio streams, and transmits the streams to the player's game terminal over the network. The player's game terminal does not need to have powerful capabilities of graphic processing and data computing, but needs to have just basic capabilities such as the capability to play back streaming media and the capability to obtain an instruction input by the player and send the instruction to the cloud server.

Figure 2:
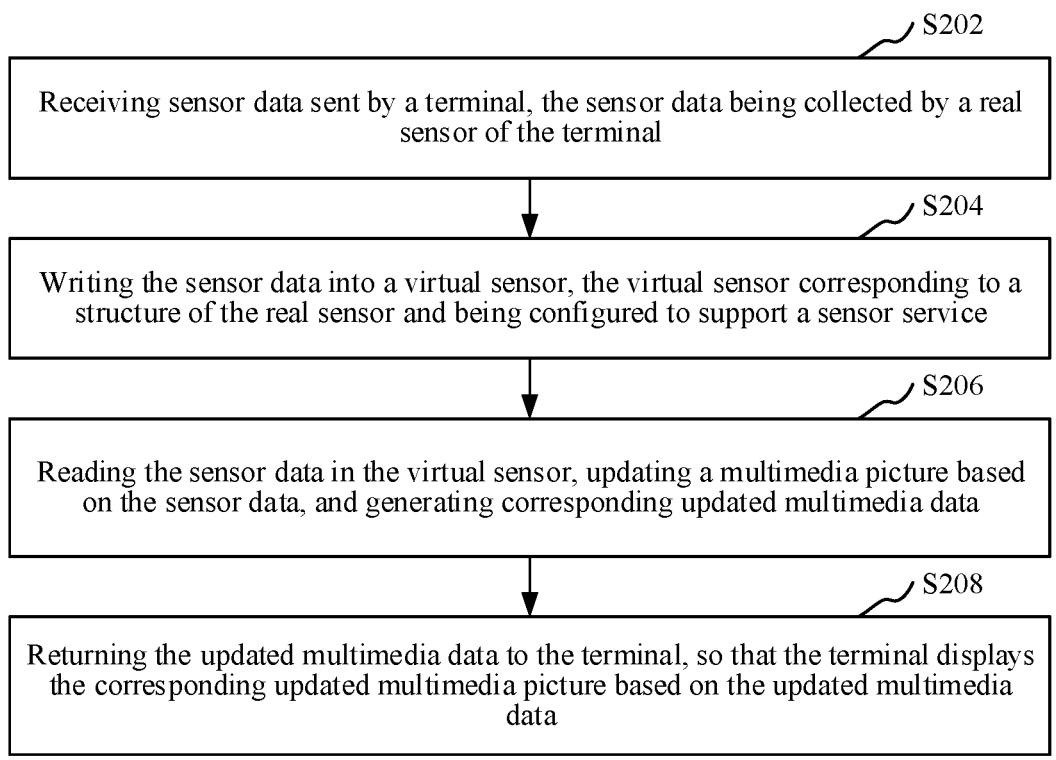
FIG. 2 is a schematic flowchart of a picture update method according to an embodiment.

In an embodiment, as shown in FIG. 2, a picture update method is provided. Using an example in which the method is applied to the server shown in FIG. 1, the method includes the following steps:

Step S202: Receiving sensor data sent by a terminal. The sensor data is collected by a physical sensor of the terminal.

The physical sensor is a hardware device deployed in the terminal, and is configured to collect data. The physical sensor is not limited in type, including a gyro sensor, acceleration sensor, gravity sensors, magnetic field sensor, geomagnetic sensor, and the like. In a terminal, a variety of physical sensors are usually configured to collect different types of data.

Specifically, the terminal may obtain a virtual sensor startup instruction through an application client, and send the virtual sensor startup instruction to the server. The virtual sensor startup instruction carries a sensor type identifier. After receiving the virtual sensor startup instruction, the server may start up a virtual sensor device corresponding to the sensor type identifier, and generate a corresponding physical sensor startup instruction. The physical sensor startup instruction carries the sensor type identifier. After receiving the physical sensor startup instruction, the terminal may start up a physical sensor corresponding to the sensor type identifier. Then the user can switch a multimedia picture in the application client of the terminal through the physical sensor. For example, by starting up the acceleration sensor in a speedboat game application, the player can control a forward direction of a speedboat through the acceleration sensor in the terminal, and then switch a currently displayed game picture. By starting up the acceleration sensor in a travel map application, the user can switch a currently displayed scenic spot picture through the acceleration sensor in the terminal. After the physical sensor is started up, the terminal can obtain the sensor data collected in real time by the physical sensor and send the data to the server.

Step S204: Writing the sensor data into a virtual sensor. The virtual sensor corresponds to a structure of the physical sensor and is configured to support a sensor service.

The virtual sensor is a virtual device deployed inside the server. The virtual sensor corresponds to a structure of the physical sensor and is configured to support the sensor service. The sensor service is a function provided by a sensor service module on the server, and is used for controlling the virtual sensor. The sensor service module may register the sensor service with a sensor management module on the server. The sensor management module is configured to register the sensor service, send the sensor service, and check health status of the sensor service. The virtual sensor includes a virtual sensor abstraction layer and a shared memory.

Specifically, the virtual sensor is pre-constructed in the server. The structure of the virtual sensor corresponds to the structure of the physical sensor in the terminal. After receiving the sensor data, the server may write the sensor data into the virtual sensor, so that the sensor data is cached in the virtual sensor. Subsequently, an application in the server (corresponding to an application on the terminal) can read the sensor data in the virtual sensor by invoking the sensor service.

In an embodiment, the virtual sensor includes a virtual sensor abstraction layer and a shared memory. The virtual sensor abstraction layer is configured to provide a virtual sensor list and a sensor interface. The shared memory is configured to generate a virtual sensor device.

Specifically, the virtual sensor includes a virtual sensor abstraction layer and a shared memory. The virtual sensor abstraction layer provides a sensor interface. An upper-layer sensor service module can drive and invoke the virtual sensor device by invoking a sensor interface. The virtual sensor abstraction layer further provides a virtual sensor list. The upper-layer sensor service module can learn currently supported sensor types and corresponding features by querying the virtual sensor list. When starting up or shutting down a type of virtual sensor, the server first checks whether the corresponding type of sensor exists in the virtual sensor list, and proceeds to the next step after the type of sensor is found. If the type of sensor is not found, the server returns a notification message to the terminal indicating failure of startup or shutdown. In addition, the server may virtualize a physical sensor device by creating a shared memory.

Figures 3, 4:
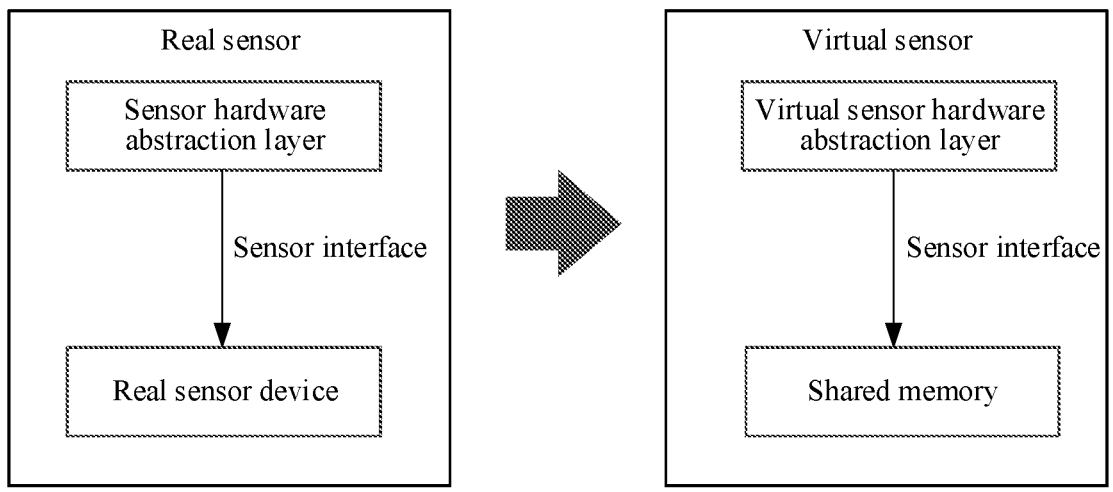
FIG. 3 is a schematic structural diagram of a virtual sensor and a physical sensor according to an embodiment.
FIG. 4 is a schematic diagram of a cloud gaming setting interface according to an embodiment.

Referring to FIG. 3, FIG. 3 is a schematic structural diagram of a physical sensor and a virtual sensor according to an embodiment. Referring to FIG. 3, the physical sensor includes a sensor hardware abstraction layer (HAL) and a physical sensor device. The sensor hardware abstraction layer provides a plurality of sensor interfaces. The virtual sensor includes a virtual sensor hardware abstraction layer (that is, virtual sensor abstraction layer) and a shared memory. The sensor hardware abstraction layer corresponds to the virtual sensor hardware abstraction layer. The physical sensor device corresponds to the shared memory. Similarly, the virtual sensor hardware abstraction layer also provides a plurality of sensor interfaces. At least one virtual sensor device can be generated based on the shared memory. For example, all virtual sensor devices may share a shared memory. All operations performed by the sensor service module on the virtual sensor device by invoking the sensor interface can be implemented by the virtual sensor abstraction layer by performing corresponding operations on the shared memory. The sensor interface may specifically include an activate interface, a setDelay interface, a poll interface, a parameter setting interface (batch interface), a flush interface, and the like. The activate interface is configured to start up or shut down a sensor device. The setDelay interface is configured to set a sampling rate of the sensor device, and is invoked for initial setting only. The poll interface is configured to read the sensor data. The batch interface is configured to set parameters of the sensor device, such as the sampling rate and a maximum reporting delay. The flush interface is configured to flush the sensor data. In this way, a virtual sensor corresponding to the structure of the physical sensor is constructed in the server. Even without a physical sensor, the server can use the virtual sensor to ensure successful startup of the sensor service.

Step S206: Reading the sensor data in the virtual sensor, updating a multimedia picture based on the sensor data, and generating corresponding updated multimedia data.

The multimedia picture is a picture that derives from observing, by a virtual object, a virtual environment from a current viewing angle. The virtual environment is a virtual environment displayed when an application on the terminal is running, such as a game picture of a cloud game in a cloud gaming application, a map picture of a scenic spot in a travel application, or the like. The virtual object is a movable object in the virtual environment, and may specifically be a virtual character, a virtual animal, or the like. The multimedia picture is a picture obtained by rendering based on a plurality of environment elements in the virtual environment. The environment elements are constituent elements of the virtual environment, and may specifically include virtual characters, virtual buildings, virtual tools, and the like. The multimedia data is multimedia data generated by encoding the rendered multimedia picture, and may specifically include audio data, video data, text data, and the like.

Specifically, the server may read the sensor data in the virtual sensor through a local application, determine viewing angle adjustment data based on the sensor data through the local application, and update a current multimedia picture corresponding to the application based on the viewing angle adjustment data, so as to obtain an updated multimedia picture. The server encodes the updated multimedia picture to obtain corresponding updated multimedia data.

In an embodiment, an application backend on the server may write the sensor data into the shared memory in the virtual sensor. The application on the server may obtain the sensor data in the shared memory through the virtual sensor abstraction layer by invoking the sensor service.

Step S208: Returning the updated multimedia data to the terminal, so that the terminal displays the corresponding updated multimedia picture based on the updated multimedia data.

Specifically, the server may send the updated multimedia data to the terminal. After receiving the updated multimedia data, the terminal decodes the updated multimedia data to obtain a corresponding updated multimedia picture, and displays the updated multimedia picture.

For example, in a cloud gaming scenario, the terminal runs a cloud gaming client. A player can start any cloud game on the cloud gaming client, such as a shooter game. Then a cloud gaming server locally runs an application corresponding to the cloud game. Referring to FIG. 4, FIG. 4 is a schematic diagram of a game configuration interface according to an embodiment. In the game configuration interface of the shooter game, the player can trigger a button that is configured to start up a gyro sensor, as shown by a region 402 in FIG. 4. Then the cloud gaming server can start up a corresponding virtual gyro sensor, and then the terminal can start up a corresponding real gyro sensor. Then the player can control the viewing angle during shooting by moving the terminal. When the player moves the terminal, the real gyro sensor on the terminal can collect corresponding sensor data, and send the sensor data to the cloud gaming server. After receiving the sensor data, the cloud gaming server may write the sensor data into the virtual sensor. A shooter game application on the cloud gaming server may read the sensor data in the virtual sensor, adjust a shooting angle based on the sensor data, update a shooting picture, and generate corresponding updated multimedia data. The cloud gaming client may receive the updated multimedia data returned by the cloud gaming server, and display the updated shooting picture corresponding to the updated multimedia data. In this way, in contrast to the conventional technology in which the player has to switch the shooting angle and the shooting picture by touching a screen with a finger, in this application, the player can switch the shooting angle and the shooting picture by moving the terminal. In addition, the player needs to touch the screen with a finger for the sole purpose of performing a shooting operation, without a need to perform other touch operations on the screen for the purpose of switching the shooting angle. This is more approximate to a real shooting scenario in which a shooter adjusts the shooting angle by moving a firearm and shoots by pulling the finger.

In the picture update method described above, the sensor data sent by the terminal is received. The sensor data is collected by the physical sensor of the terminal. The sensor data written into the virtual sensor. The virtual sensor corresponds to the structure of the physical sensor and is configured to support the sensor service. The sensor data in the virtual sensor is read. The multimedia picture is updated based on the sensor data. The corresponding updated multimedia data is generated. The updated multimedia data is returned to the terminal, so that the terminal displays the corresponding updated multimedia picture based on the updated multimedia data. In this way, the virtual sensor corresponding to the structure of the physical sensor is pre-constructed in the server. The virtual sensor may be configured to store the sensor data and support the sensor service. Therefore, in a scenario in which the application runs on a cloud server, even without a physical sensor, the server can still use the virtual sensor to start up the sensor service to control the physical sensor of the terminal. The server can read the sensor data in the virtual sensor, the sensor data being collected by the physical sensor as triggered by a user operation and is sent by the terminal. The server updates the multimedia picture based on the sensor data, and generates the corresponding updated multimedia data. After receiving the updated multimedia data, the terminal can display the multimedia picture corresponding to the updated multimedia data. Finally, in this scenario, the picture displayed by the application on the terminal can still be updated by the physical sensor by detecting a user operation on the terminal.

Figure 5:
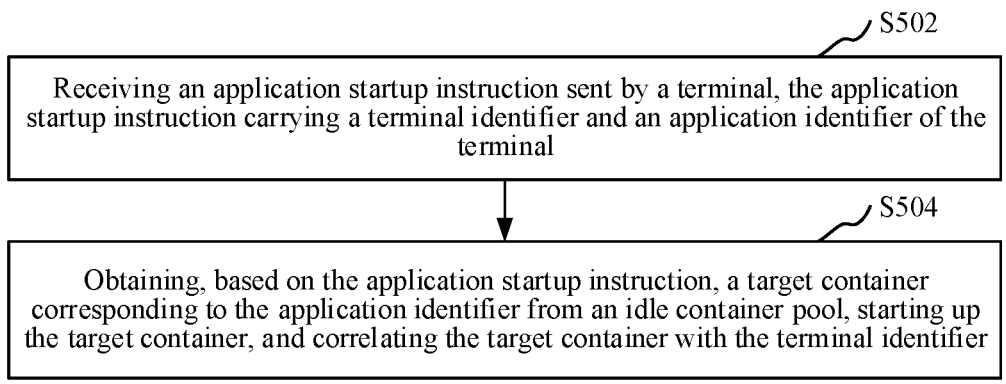
FIG. 5 is a schematic flowchart of starting up a target container according to an embodiment.

In an embodiment, as shown in FIG. 5, before receiving the sensor data sent by the terminal, the picture update method further includes the following steps:

Step S502: Receiving an application startup instruction sent by the terminal. The application startup instruction carries a terminal identifier and an application identifier of the terminal.

Step S504: Obtaining, based on the application startup instruction, a target container corresponding to the application identifier from an idle container pool, starting up the target container, and correlating the target container with the terminal identifier.

The application startup instruction is used for starting up the target container deployed on the server. An application is deployed in the target container. At least one container may be deployed on the server. An operating system runs in the container, and the application runs on the operating system. An application is installed in one container. The applications installed in different containers may be the same or different. The server may correlate the application identifier of the application in the container with the container. The containers on the server may be classed into idle containers and serving containers depending on running status of the containers. The running status of the container includes an idle state and a serving state. When the container is in an idle state, it indicates that the container is not running and is not allocated to the terminal to run the application, and the container is an idle container. When the container is in a serving state, it indicates that the container is running and has been allocated to the terminal to run the application, and the container is a serving container. An idle container pool includes at least one idle container.

Specifically, an application client may run on the terminal. The application client may display a list of applications that can be installed and run as currently supported by the server. The list of applications may display information such as application identifier, application rating, and application introduction, to facilitate users to have a preliminary understanding of each application. The terminal may receive a trigger operation effectuated by the user on any application in the list of applications, and generate an application startup instruction based on the trigger operation. The application startup instruction carries a terminal identifier of the terminal and an application identifier of the application triggered by the user. The terminal may send the application startup instruction to the server. After receiving the application startup instruction, the server may allocate a corresponding target container to the terminal. Specifically, the server may, based on the application startup instruction, search the idle container pool for an idle container correlated with the application identifier, and use the idle container as a target container. The server starts up and runs the target container, and correlates the target container with the terminal identifier, so as to allocate the target container to the terminal to serve the terminal. After being started up, the target container may generate a multimedia picture in real time, and transmit multimedia data corresponding to the multimedia picture to the terminal in real time. The application client on the terminal may display the corresponding multimedia picture based on the multimedia data.

For example, the application client on the terminal is a cloud gaming client. The cloud gaming client displays a shooter cloud game, a fighting cloud game, and a driving cloud game. The user may click/tap the driving cloud game on the cloud gaming client. Then the cloud gaming server can allocate a target container corresponding to the driving cloud game to the terminal, and run the target container. In this way, a game picture corresponding to the driving cloud game can be displayed on the terminal. The trigger operation may specifically be a touch operation, cursor operation, keystroke operation, voice operation, or the like.

In this embodiment, the application is installed in the container of the server. The container of the server runs the application. In this way, the user does not need to install the application on the terminal, thereby effectively saving storage resources of the terminal.

In an embodiment, the sensor data carries the terminal identifier, and the receiving sensor data sent by a terminal includes: receiving, by using an application proxy, the sensor data sent by the terminal, and inputting the sensor data into the target container based on the terminal identifier. The target container contains an application corresponding to the application identifier, a sensor service module, a virtual sensor, and an application backend. The sensor service module is configured to provide the sensor service. The application backend is configured to receive the sensor data input by the application proxy, and write the sensor data into the virtual sensor. The application is configured to invoke the sensor service module to read the sensor data in the virtual sensor, update the multimedia picture based on the sensor data, and send the updated multimedia picture to the application backend. The application backend is further configured to generate the corresponding updated multimedia data based on the updated multimedia picture, and send the updated multimedia data to the terminal through the application proxy.

Specifically, the server contains the application proxy and the target container. The target container contains the application, the sensor service module, the virtual sensor, and the application backend. The application and the virtual sensor transmit data through the sensor service module. The target container and the application proxy transmit data through the application backend. The target container and the terminal transmit data through the application proxy. The application proxy may receive the sensor data sent by the terminal, and input the sensor data into the target container. The application proxy may specifically input the sensor data into the application backend in the target container. The application backend writes the sensor data into the virtual sensor, and caches the sensor data in the virtual sensor. The application may invoke the sensor service module to read the sensor data in the virtual sensor. The application may update the multimedia picture based on the sensor data to obtain an updated multimedia picture, and send the updated multimedia picture to the application backend. The application backend encodes the updated multimedia picture to obtain updated multimedia data, and sends the updated multimedia data to the application proxy. The application proxy sends the updated multimedia data to the terminal.

In an embodiment, the application proxy and the terminal transmit data based on Web Real-Time Communication (WebRTC) technology. The application proxy may receive, through a WebRTC data channel, the sensor data sent by the terminal. The application proxy may send the updated multimedia data to the terminal through a WebRTC video channel. Further, the application proxy may compress the updated multimedia data, and send the compressed updated multimedia data to the terminal, so as to reduce the amount of data transmitted over the network and increase the speed of data transmission.

In this embodiment, orderly data transmission can be ensured between the server and the terminal by virtue of interoperability between the application, the sensor service module, the virtual sensor, the application backend, the application proxy, and the terminal.

Figure 6:
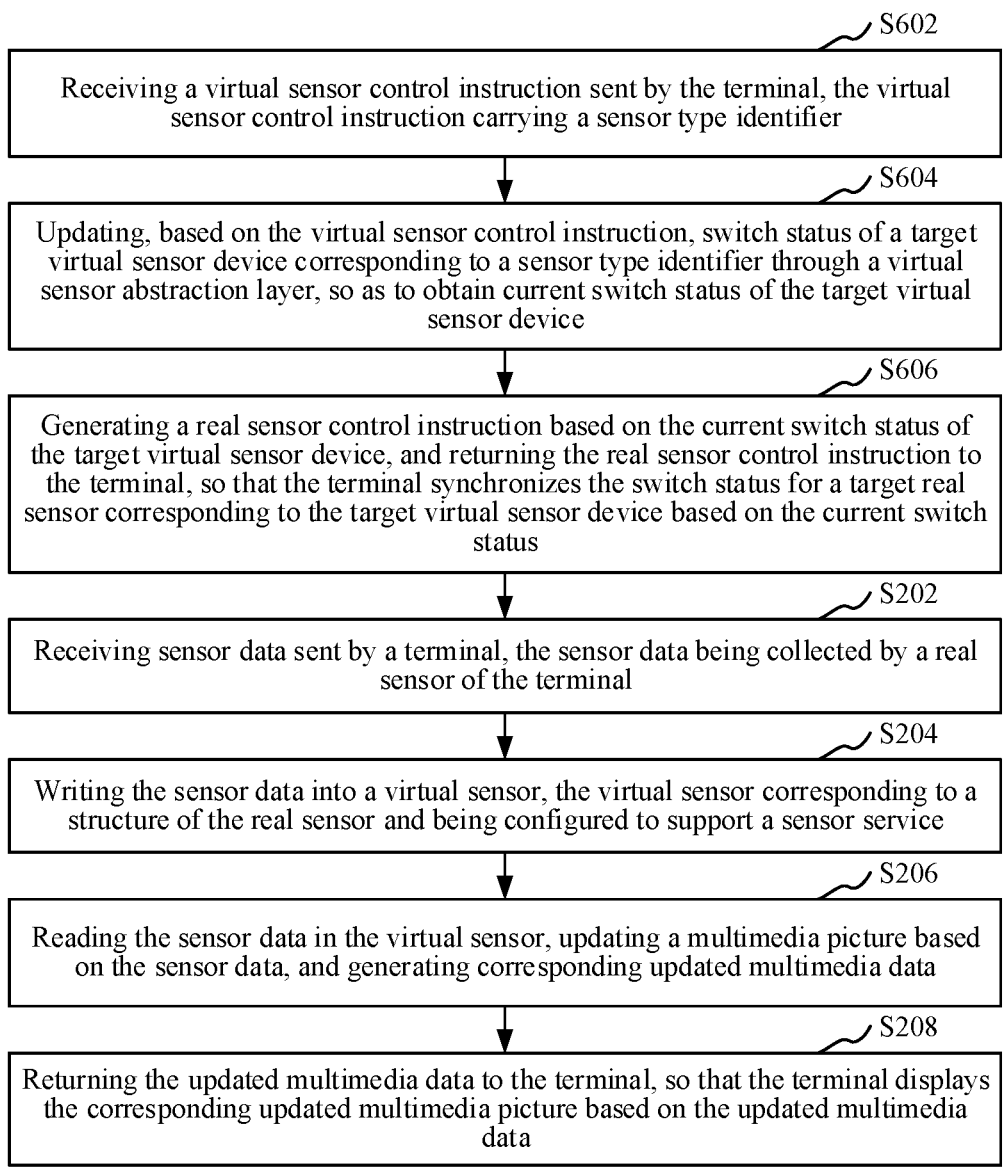
FIG. 6 is a schematic flowchart of controlling a virtual sensor and a physical sensor according to an embodiment.

In an embodiment, as shown in FIG. 6, before receiving the sensor data sent by the terminal, the picture update method further includes the following steps:

Step S602: Receiving a virtual sensor control instruction sent by the terminal. The virtual sensor control instruction carries a sensor type identifier.

The virtual sensor control instruction is used for controlling switch status of the virtual sensor device, and specifically, for starting up the virtual sensor device or shutting down the virtual sensor device. The sensor type identifier is an identifier that is used for uniquely identifying the type of the sensor, and may specifically include at least one of numerals, letters, or characters.

Specifically, the terminal may display an application configuration interface. The application configuration interface displays controls that are configured to trigger a sensor control operation, such as a control configured to control the startup or shutdown of an acceleration sensor. When detecting a trigger operation effectuated by the user on the control, the terminal generates a virtual sensor control instruction based on the sensor type identifier corresponding to the control, and sends the virtual sensor control instruction to the server. In an embodiment, the terminal may send the virtual sensor control instruction to the application in the target container through an application proxy or an application backend on the server.

Step S604: Updating, based on the virtual sensor control instruction, switch status of a target virtual sensor device corresponding to a sensor type identifier through a virtual sensor abstraction layer, so as to obtain current switch status of the target virtual sensor device.

The switch status includes an ON state and an OFF state. The ON state and the OFF state are mutually exclusive states. The current switch status is the updated switch status of the target virtual sensor device.

Specifically, after receiving the virtual sensor control instruction, the server may modify, through the virtual sensor abstraction layer, the switch status of the target virtual sensor device corresponding to the sensor type identifier from the original OFF state to the ON state that is mutually exclusive against the OFF state, or, modify the switch status of the target virtual sensor device corresponding to the sensor type identifier from the original ON state to the OFF state that is mutually exclusive against the ON state. Certainly, the virtual sensor control instruction may further carry a specific control type. The control type includes startup or shutdown. After receiving the virtual sensor control instruction, the server modifies the switch status of the target virtual sensor device based on the control type. For example, if the control type is startup, the server modifies the switch status of the target virtual sensor device to the ON state when the original switch status of the target virtual sensor device is the OFF state. The server maintains the switch status of the target virtual sensor device at the ON state when the original switch status of the target virtual sensor device is the ON state. In an embodiment, after receiving the virtual sensor control instruction, the application in the target container updates, through the virtual sensor abstraction layer, the switch status of the target virtual sensor device corresponding to the sensor type identifier to obtain the current switch status of the target virtual sensor device.

Step S606: Generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status.

The physical sensor control instruction is used for controlling switch status of a physical sensor device, and specifically, for starting up the physical sensor device or shutting down the physical sensor device.

Specifically, after the switch status of the target virtual sensor device is updated, the server generates a physical sensor control instruction based on the current switch status of the target virtual sensor device, and sends the physical sensor control instruction to the terminal. After receiving the physical sensor control instruction, the terminal modifies the switch status of the target physical sensor corresponding to the target virtual sensor device to a state that is consistent with the current switch status of the target virtual sensor device. For example, if the current switch status of a virtual acceleration sensor device is the ON state, the physical sensor control instruction is used for instructing the terminal to modify the switch status of a real acceleration sensor to the ON state, that is, to start up the real acceleration sensor. In an embodiment, the application backend on the server generates a physical sensor control instruction based on the current switch status of the target virtual sensor device, and returns the physical sensor control instruction to the terminal through the application proxy.

In this embodiment, the virtual sensor control instruction sent by the terminal may instruct the server to update the switch status of the corresponding target virtual sensor device, so as to start up or shut down the local virtual sensor device of the server. The physical sensor control instruction, which is generated by the server based on the current switch status of the target virtual sensor device, can instruct the terminal to update the switch status of the target physical sensor corresponding to the target virtual sensor device, so as to start up or shut down the local physical sensor of the terminal. Finally, status synchronization is implemented between the virtual sensor device and the corresponding physical sensor, thereby facilitating transmission of the sensor data between the terminal and the server.

In an embodiment, after receiving the virtual sensor control instruction sent by the terminal, the picture update method further includes: invoking a sensor creation function in the virtual sensor abstraction layer through a sensor service based on the virtual sensor control instruction; and generating a sensor interface and a shared memory based on the sensor creation function.

Specifically, the sensor creation function is defined in the virtual sensor abstraction layer. The sensor creation function is used for generating the sensor interface and the shared memory. When the application in the target container initially receives the virtual sensor control instruction, the application invokes the sensor creation function through the sensor service, generates each sensor interface based on the sensor creation function, and generates the shared memory based on the sensor creation function to implement the virtual sensor device. Subsequently, the application can start up or shut down the corresponding virtual sensor device by invoking an activate interface through the sensor service, and read the sensor data by invoking a poll interface through the sensor service.

In an embodiment, a sensors_module_mothods structure in the virtual sensor abstraction layer defines an open_sensors function (sensor creation function). When invoking the open_sensors function through the sensor service, the application in the target container invokes the open_sensors function in the sensors_module_mothods structure, creates a sensor interface by using the open_sensors function, and creates a shared memory (/dev/shm/sensors) based on a Linux standard interface by using the open_sensors function.

Figure 7:
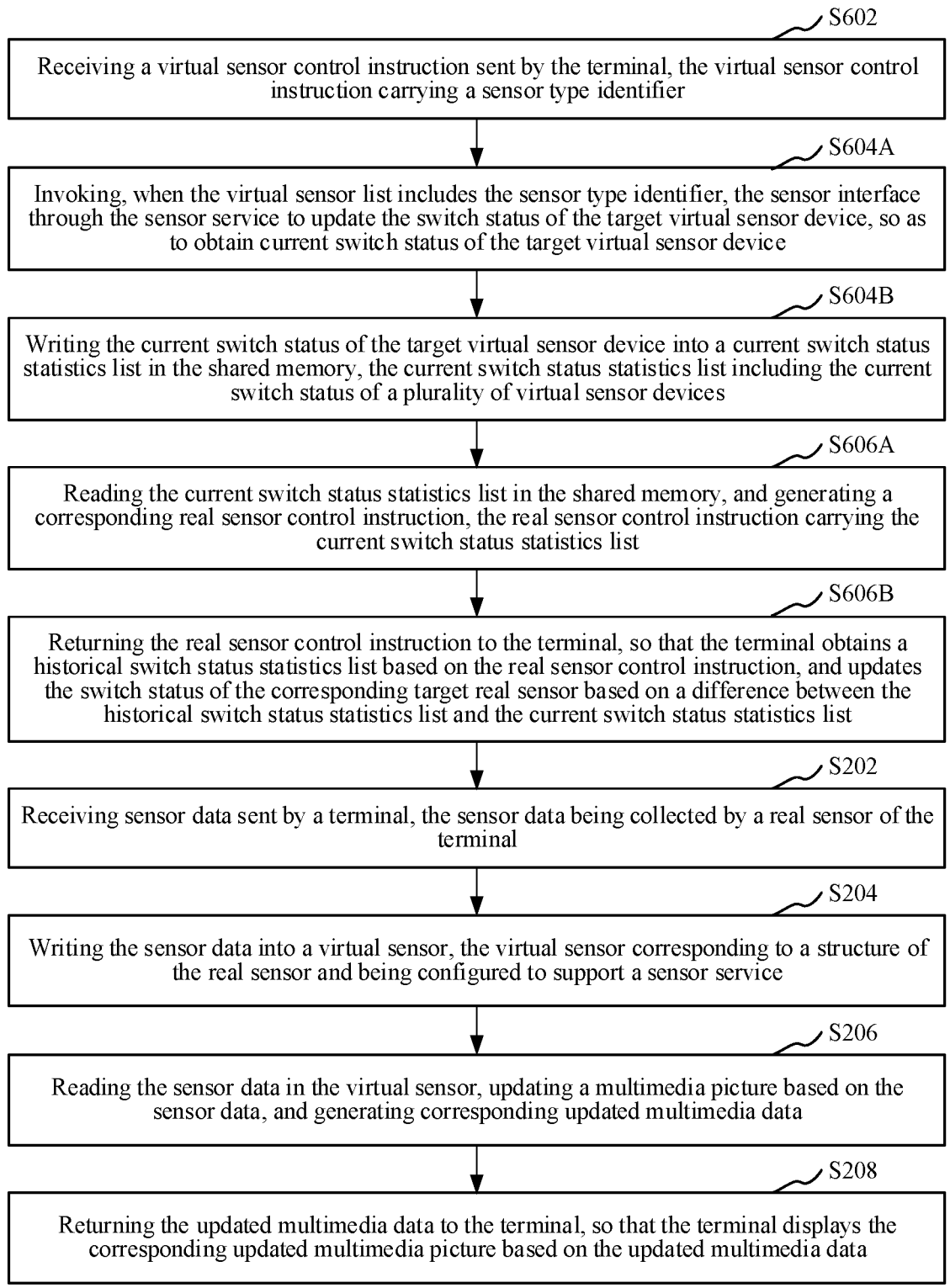
FIG. 7 is a schematic flowchart of controlling a virtual sensor and a physical sensor according to another embodiment.

In an embodiment, as shown in FIG. 7, the updating, based on the virtual sensor control instruction, switch status of a target virtual sensor device corresponding to the sensor type identifier through the virtual sensor abstraction layer, so as to obtain current switch status of the target virtual sensor device, includes the following steps:

Step S604A: Invoking, when the virtual sensor list includes the sensor type identifier, the sensor interface through the sensor service to update the switch status of the target virtual sensor device, so as to obtain current switch status of the target virtual sensor device.

Specifically, after receiving the virtual sensor control instruction, the server may invoke the sensor service to query whether the sensor type identifier exists in the virtual sensor list of the virtual sensor abstraction layer. When the sensor type identifier exists, it is determined that the server currently supports the target virtual sensor device corresponding to the sensor type identifier. Therefore, the server can invoke the sensor interface through the sensor service to update the switch status of the target virtual sensor device. To be specific, a sensor service module on the server can invoke the sensor interface (activate interface) to update the switch status of the target virtual sensor device to obtain the current switch status of the target virtual sensor device. For example, because the switch status includes an ON state and an OFF state only, the OFF state may be denoted as 0, and the ON state may be denoted as 1. If the virtual sensor control instruction is intended to start up the target virtual sensor device, the server may denote the switch status of the target virtual sensor device as 1. In an embodiment, by invoking the sensor service, the application in the target container instructs the sensor service module to invoke the sensor interface to update the switch status of the target virtual sensor device.

Step S604B: Writing the current switch status of the target virtual sensor device into a current switch status statistics list in the shared memory. The current switch status statistics list includes the current switch status of a plurality of virtual sensor devices.

Specifically, the server may write the current switch status of the target virtual sensor device into the current switch status statistics list in the shared memory. To be specific, the server may save the current switch status of the target virtual sensor device into the current switch status statistics list in the shared memory. The current switch status statistics list includes the current switch status of a plurality of virtual sensor devices. The current switch status statistics list is available for querying to learn in real time whether each virtual sensor device is currently in an ON state or an OFF state.

In this embodiment, the server does not perform a switch status update operation on the target virtual sensor device until the virtual sensor list includes the sensor type identifier, thereby ensuring effectiveness of the switch status update operation. By writing the current switch status of the target virtual sensor device into the current switch status statistics list in the shared memory, it is convenient for the terminal to subsequently accurately identify and control the target physical sensor corresponding to the target virtual sensor device.

In an embodiment, as shown in FIG. 7, the generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status, include the following steps:

Step S606A: Reading the current switch status statistics list in the shared memory, and generating a corresponding physical sensor control instruction. The physical sensor control instruction carries the current switch status statistics list.

Step S606B: Returning the physical sensor control instruction to the terminal, so that the terminal obtains a historical switch status statistics list based on the physical sensor control instruction, and updates the switch status of the corresponding target physical sensor based on a difference between the historical switch status statistics list and the current switch status statistics list.

The current switch status statistics list is the latest generated switch status statistics list. The historical switch status statistics list is the previous generated switch status statistics list. Upon receiving each physical sensor control instruction that carries the switch status statistics list, the terminal saves the switch status statistics list locally.

Specifically, the server may monitor the switch status statistics list in the shared memory in real time. When the server updates the switch status of the target virtual sensor device based on the virtual sensor control instruction so that the switch status statistics list is changed, the server may read the current switch status statistics list in the shared memory, generate a physical sensor control instruction that carries the current switch status statistics list, and send the physical sensor control instruction to the terminal. After receiving the physical sensor control instruction, the terminal may save the current switch status statistics list locally, obtain the previous saved historical switch status statistics list locally, and compare the current switch status statistics list with the historical switch status statistics list to determine whether the switch status of the target virtual sensor device has changed, and to determine the current switch status of the target virtual sensor device. If the comparison of the statistics list shows that the switch status of the target virtual sensor device has changed, the terminal may modify the switch status of the target physical sensor corresponding to the target virtual sensor device to a state that is consistent with the current switch status of the target virtual sensor device. Based on the sensor type identifier, the terminal may determine the target physical sensor corresponding to the target virtual sensor device. The sensor type identifier of the target virtual sensor device is consistent with the sensor type identifier of the target physical sensor.

Figure 8:
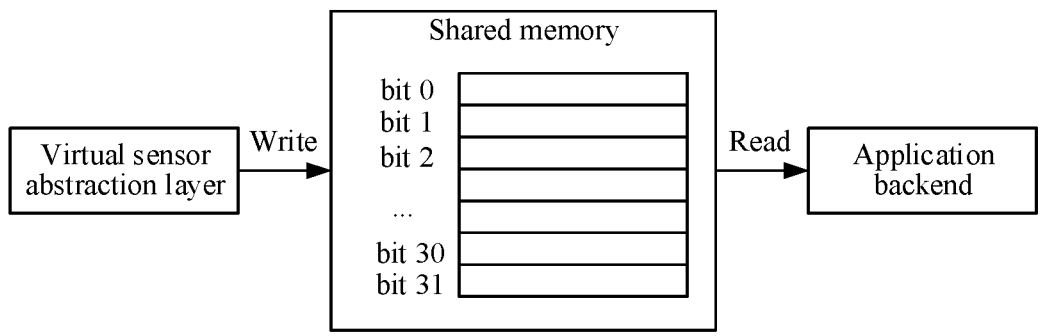
FIG. 8 is a schematic diagram of monitoring switch status of a sensor according to an embodiment.

In an embodiment, the application in the target container may obtain the current switch status of a specified sensor through an activate interface, and save the current switch status into a 32-bit variable startedSensors in the shared memory. Each bit in the startedSensors variable represents a sensor, the bit 0 denotes OFF, and the bit 1 denotes ON. Referring to FIG. 8, the application backend on the server may monitor the change of the switch status of each sensor in the startedSensors variable in real time through the virtual sensor abstraction layer. Once a change of the startedSensors variable is detected, the application backend on the server sends the startedSensors variable to the application proxy on the server through a Socket protocol, and then sends the variable to the terminal through the application proxy. After receiving the startedSensors variable, the terminal compares the startedSensors variable with the previous saved startedSensors variable. Based on a result of the comparison, the terminal determines the change of the switch status of each sensor, for example, the change from 0 to 1 or from 1 to 0, and then the terminal starts up or shuts down the corresponding physical sensor. The terminal may determine mSensorNum and mSensors based on the startedSensors variable. mSensorNum is the number of sensors that need to be started up and the number is received by the terminal. The mSensors array stores the types of sensors that need to be started up. The terminal can start up the sensors through a registerListener function of an Android SDK. The sensor data is obtained from an onSensorChanged callback function of the Android SDK, and is sent to the application proxy on the server through a WebRTC data channel. The application proxy further transmits the sensor data to the application backend through the Socket protocol. The application backend writes the received sensor data into a queue in the shared memory. The virtual sensor hardware abstraction layer reads the sensor data in the queue and sends the sensor data to the application.

In this embodiment, the physical sensor control instruction that carries the current switch status statistics list is generated and sent to the terminal. Therefore, the terminal can accurately update the switch status of the corresponding target physical sensor based on a difference between the historical switch status statistics list and the current switch status statistics list.

In an embodiment, the writing the sensor data into the virtual sensor includes: writing the sensor data into a tail of the queue in the shared memory, and updating a tail identifier. The reading the sensor data in the virtual sensor includes: reading the sensor data at a head of the queue, and updating a head identifier.

Specifically, the virtual sensor abstraction layer and the application backend transmit the sensor data through the shared memory. Specifically, a queue configured to store the sensor data may be created in the shared memory, and the queue is based on a first-in first-out principle. Upon receiving each item of sensor data sent by the terminal, the application backend on the server writes the sensor data to the tail of the queue in the shared memory, and updates a queue tail pointer, that is, updates the queue tail identifier. By invoking a poll interface of the virtual sensor abstraction layer through the sensor service, the application in the target container reads the corresponding sensor data at the head of the queue in the shared memory, and updates a queue head pointer, that is, updates the queue head identifier.

Figure 9:
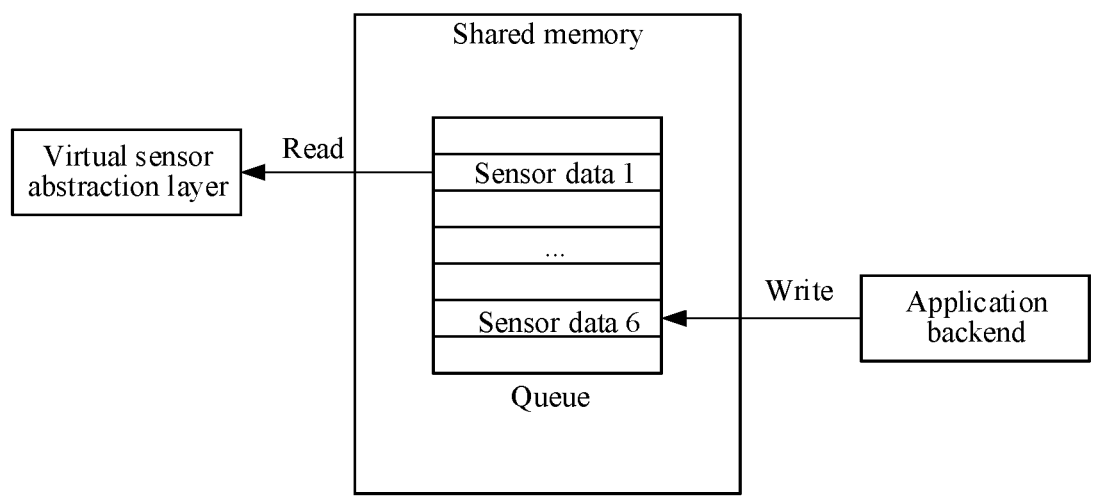
FIG. 9 is a schematic diagram of transmission of sensor data according to an embodiment.

Referring to FIG. 9, the virtual sensor hardware abstraction layer and the application backend transmit the sensor data (sensors_event_t) through the shared memory (/dev/shm/sensors). A queue is created in the shared memory. Upon obtaining an item of sensor data from the terminal, the application backend writes the sensor data to the tail of the queue, and updates the tail pointer: tail=(tail+1)% (Queue Length), where the Queue Length is the length of the queue. In addition, an int-type variable mLastWrapCnt is introduced into the shared memory to record a wrap count, that is, the number of wrap-arounds that occur because the tail pointer exceeds the head pointer. At the same time, the virtual sensor abstraction layer reads the corresponding sensor data at the head of the queue, and updates the head pointer: head=(head+1)% (Queue Length).

In this embodiment, the sensor data is stored in a queue. The tail identifier is updated whenever an item of sensor data is written, and the head identifier is updated whenever an item of sensor data is read, thereby ensuring orderliness of writing and reading the sensor data. In addition, the head identifier and the tail identifier help to subsequently determine and read the latest stored sensor data quickly.

Figure 10:
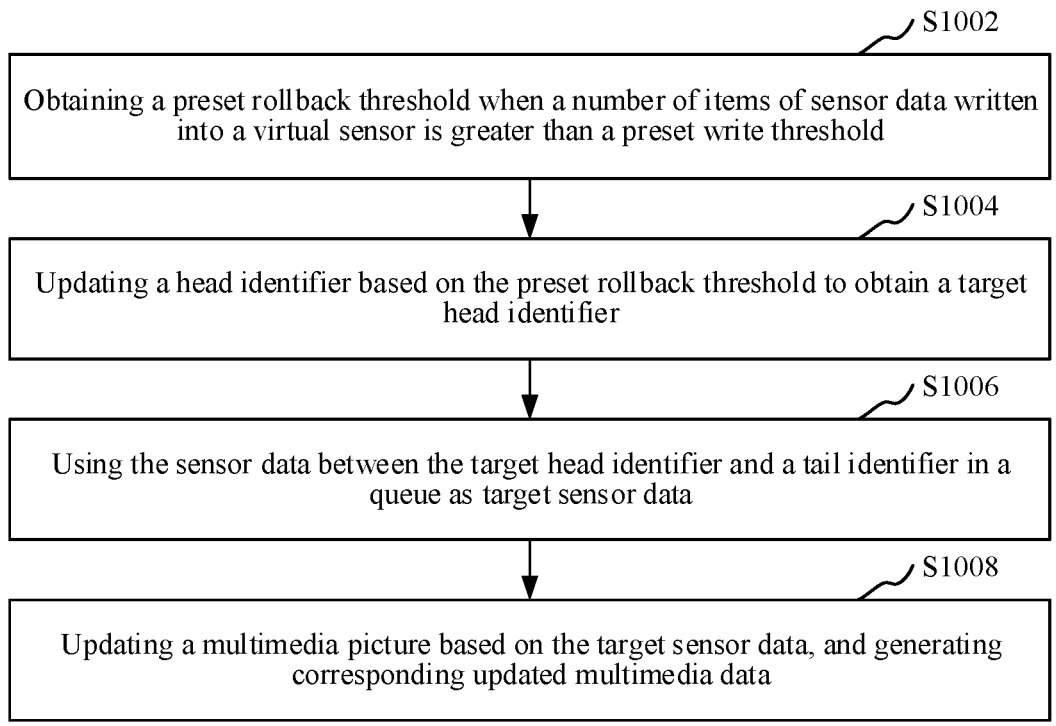
FIG. 10 is a schematic flowchart of filtering sensor data according to an embodiment.

In an embodiment, as shown in FIG. 10, the reading the sensor data in the virtual sensor, updating a multimedia picture based on the sensor data, and generating corresponding updated multimedia data, include the following steps:

Step S1002: Obtaining a preset rollback threshold when a number of items of the sensor data written into the virtual sensor is greater than a preset write threshold;

Step S1004: Updating the head identifier based on the preset rollback threshold to obtain a target head identifier;

Step S1006: Using the sensor data between the target head identifier and the tail identifier in the queue as target sensor data; and Step S1008: Updating the multimedia picture based on the target sensor data, and generating the corresponding updated multimedia data.

Specifically, when the network remains normal all along, the reading speed is basically the same as the writing speed of the sensor data. In this way, the server can keep updating the multimedia picture based on the latest sensor data all along, so as to respond to the latest movement operation of the user on the terminal in time and implement correct switching of the picture on the terminal in time. However, when the terminal is temporarily disconnected from the server due to transitory abnormality of the network, the sensor data collected by the physical sensor in real time accumulate on the terminal. When the network returns to normal, the terminal sends the accumulated sensor data to the server together. The application backend on the server writes the accumulated sensor data into the queue of the shared memory together. Therefore, the application on the server needs to read old sensor data first and update the multimedia picture based on the old sensor data first. Consequently, the response to the latest movement operation of the user on the terminal is delayed, and the correct switching of the picture on the terminal in time is not implemented. When the number of items of the sensor data written into the virtual sensor is greater than the preset write threshold, it means that the writing speed of the sensor data is greater than the reading speed. In this case, the application on the server may obtain a preset rollback threshold, and roll back the head identifier based on the preset rollback threshold to obtain a target head identifier. By invoking the poll interface, the application on the server reads sensor data between the target head identifier and the tail identifier in the queue as target sensor data. That is, the application reads, in the queue, the latest written sensor data of which the number of items meets the preset rollback threshold. The application updates the multimedia picture based on the latest written target sensor data, and generates corresponding updated multimedia data. The preset rollback threshold may be user-defined as actually required.

In an embodiment, in a case of head==tail, two scenarios are possible. In one scenario, the queue is empty, the virtual sensor hardware abstraction layer is blocked from reading data and enters a sleep state, waiting for the application backend to write data. This scenario usually occurs when the server just begins to run the application. In the other scenario, the application backend writes data so fast that the tail pointer exceeds the head pointer and wraps around. In this case, the application backend increments the mLastWrapCnt variable by 1 to indicate that the wrap count is incremented by 1. In the case of wrap-around, it indicates that the reading speed of the virtual sensor abstraction layer is slower than the writing speed of the application backend. When the terminal incurs network uplink jitter which leads to delay variation of the sent sensor data, it is probable that dozens of sensor data items accumulate on the terminal, and then the accumulated dozens of sensor data items are sent to the application backend instantly. The application backend writes the sensor data items into the queue, causing the tail pointer to exceed the head pointer and wrap around. In this case, it is appropriate for the virtual sensor abstraction layer to read the latest written sensor data. Therefore, the head pointer is rolled back by the preset rollback threshold, so that the virtual sensor abstraction layer reads the latest written sensor data. For example, the head pointer is rolled back by 10, so that the virtual sensor abstraction layer reads the 10 latest written items of sensor data, thereby avoiding delay of switching the picture caused by too slow reading and reading of just old sensor data. In addition, subsequently written new data automatically overwrites the old data stored at the same location.

In this embodiment, when the writing speed of the sensor data is greater than the reading speed, a preset rollback threshold is obtained. The head identifier of the queue is adjusted based on the preset rollback threshold, thereby ensuring that the latest written sensor data is read quickly, and in turn, ensuring that the picture is switched correctly in time.

In an embodiment, the updating a multimedia picture based on the sensor data, and generating corresponding updated multimedia data, include: obtaining a panoramic picture, the multimedia picture being a picture that matches a first viewing angle in the panoramic picture, and the first viewing angle being a current viewing angle; adjusting the first viewing angle based on the sensor data to obtain a second viewing angle; and determining a picture that matches the second viewing angle in the panoramic picture, generating corresponding multimedia viewing angle update data, and using the multimedia viewing angle update data as the updated multimedia data. The returning the updated multimedia data to the terminal, so that the terminal displays the corresponding updated multimedia picture based on the updated multimedia data, includes: returning the multimedia viewing angle update data to the terminal, so that the terminal switches, based on the multimedia viewing angle update data, a currently displayed picture from the picture corresponding to the first viewing angle to the picture corresponding to the second viewing angle.

The panoramic picture is a picture that derives from observing, by a virtual object, a virtual environment from a 360-degree angle. The multimedia picture is a picture that is currently displayed by the terminal after the physical sensor is started up and before the user changes the status of the terminal in a space, and is a picture that derives from observing, by the virtual object, the virtual environment from a current viewing angle (the first viewing angle). For example, the multimedia picture is a picture that derives from observing due north, by a soldier game character at the current position. The multimedia viewing angle update data is the updated multimedia data corresponding to the updated multimedia picture after the viewing angle is updated.

Specifically, the sensor data carries a timestamp. The server may obtain a panoramic picture corresponding to the timestamp from a local location or from another server. For example, when the application is a travel application, the server may obtain a panoramic picture from a local location, where the panoramic picture derives from observing, by the virtual object, a scenic spot A from a 360-degree angle at the current moment. When the application is a cloud gaming application, the server may obtain a panoramic picture from a game server, where the panoramic picture derives from observing, by the virtual object, a surrounding game environment from a 360-degree angle at the current moment. The server analyzes the sensor data, determines a moving direction and a moving angle of the terminal, and adjusts the first viewing angle based on the moving direction and the moving angle of the terminal to obtain a second viewing angle. From the panoramic picture, the server may determine a picture that derives from observing, by the virtual object at the current position, the virtual environment from the second viewing angle. The server may generate corresponding multimedia viewing angle update data, and send the multimedia viewing angle update data to the terminal as the updated multimedia data. After receiving the multimedia viewing angle update data, the terminal may switch, based on the multimedia viewing angle update data, a currently displayed picture from the picture corresponding to the first viewing angle to the picture corresponding to the second viewing angle. For example, in response to the user's operation of rotating the terminal in the space, the viewing angle of the soldier game character is gradually adjusted from the due north direction to the due east direction, and the terminal gradually switches the displayed picture gradually from the picture corresponding to the due north direction to the picture corresponding to the due east direction. In this way, compared with the conventional technology in which the user has to click/tap or drag on the screen to switch the displayed picture on the terminal, the implementation solution herein enables the user to switch the displayed picture on the terminal by simply moving the terminal, thereby simplifying the user's operation and improving convenience.

Figure 11:
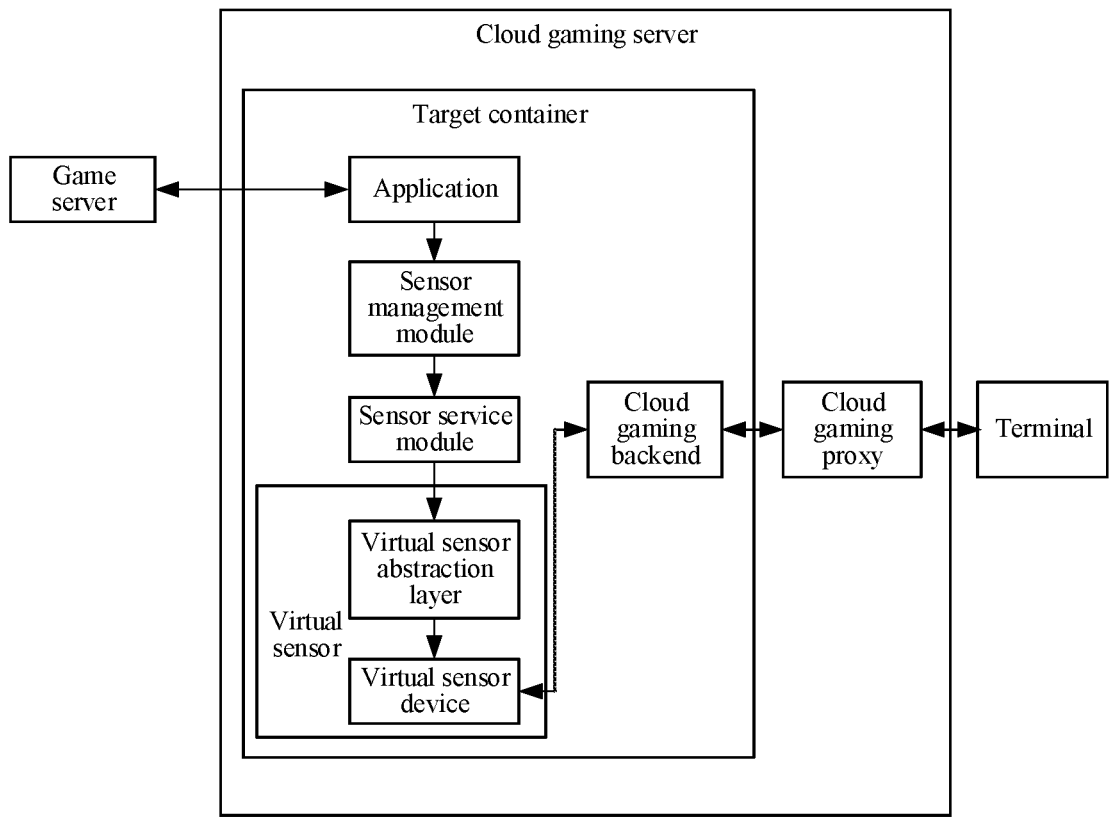
FIG. 11 is a schematic diagram of an overall architecture corresponding to a picture update method according to an embodiment.

Referring to FIG. 11, FIG. 11 is a schematic diagram of an overall architecture corresponding to a picture update method. Using a cloud game as an example, as shown in FIG. 11, a target container (Android container) runs on a cloud gaming server. An operating system in the target container is an Android system. The target container includes a cloud gaming application (Game App), a sensor management module (Sensor Manager), a sensor service module (Sensor Service), a virtual sensor, and a cloud gaming backend. The virtual sensor includes a virtual sensor hardware abstraction layer (HAL) and a virtual sensor device. By constructing a virtual sensor corresponding to the structure of the physical sensor, it is ensured that the cloud gaming application successfully starts up the sensor service. The cloud gaming server further includes a cloud gaming proxy. The cloud gaming server communicates with the terminal over a network, and the cloud gaming server communicates with a game server over the network.

1. Starting a Cloud Game

The cloud gaming proxy receives a cloud gaming startup instruction sent by the terminal. The cloud gaming startup instruction carries a cloud gaming identifier. The cloud gaming server runs a target container corresponding to the cloud gaming identifier based on the cloud gaming startup instruction. A cloud gaming application corresponding to the cloud gaming identifier is installed in the target container.

2. Starting Up a Virtual Sensor Device and a Physical Sensor

The cloud gaming proxy receives a virtual sensor startup instruction sent by the terminal. The virtual sensor startup instruction carries a sensor type identifier of a gyro sensor. The cloud gaming proxy sends the virtual sensor startup instruction to the cloud gaming application through the cloud gaming backend. The cloud gaming application invokes the sensor service module through the sensor management module, invokes, through the sensor service module, a sensor creation function provided by the virtual sensor abstraction layer, generates each sensor interface and a shared memory based on the sensor creation function, generates at least one virtual sensor device through the shared memory, and creates, in the shared memory, a queue that is configured to store sensor data. Further, the cloud gaming application starts up the virtual gyro sensor device by invoking an activate interface provided by the virtual sensor abstraction layer, and saves startup status of a virtual gyro sensor device into a 32-bit variable startedSensors in the shared memory through the virtual sensor abstraction layer. In the startedSensors variable, each bit represents a sensor, the bit 0 denotes OFF, and the bit 1 denotes ON. When detecting a change of the startedSensors variable, the cloud gaming backend sends the startedSensors variable to the cloud gaming proxy through a Socket protocol, and then sends the startedSensors variable to the terminal through the cloud gaming proxy. After receiving the startedSensors variable, the terminal compares the startedSensors variable with the previous saved startedSensors variable. Based on a result of the comparison, the terminal starts up the corresponding real gyro sensor.

3. Transmitting the Sensor Data

The real gyro sensor on the terminal collects the sensor data that arises from changing, by the user, the status of the terminal in the space. Each item of sensor data obtained by the cloud gaming backend from the terminal through the cloud gaming proxy is written to the tail of the queue in the shared memory successively in chronological order, and then the tail pointer is updated: tail=(tail+1)% (Queue Length), where the Queue Length is the length of the queue. In addition, an int-type variable mLastWrapCnt is introduced into the shared memory to record a wrap count, that is, the number of wrap-arounds that occur because the tail pointer exceeds the head pointer. By invoking the poll interface provided by the virtual sensor abstraction layer, the cloud gaming application reads the sensor data at the head of the queue, and updates the head pointer: head=(head+1)% (Queue Length). When occurrence of wrap-around is determined based on the tail pointer, the head pointer, and mLastWrapCnt, the cloud gaming application rolls back the head pointer by a preset rollback threshold, so that the cloud gaming application can read the latest written sensor data of which the number of items meets the preset rollback threshold.

4. Switching the Viewing Angle and the Picture

The cloud gaming application obtains, from the game server, a panoramic picture and a multimedia picture corresponding to the current viewing angle (the first viewing angle), adjusts the first viewing angle based on the read sensor data to obtain a second viewing angle, determines the corresponding updated media picture corresponding to the first viewing angle from the panoramic picture, and sends the updated multimedia picture to the cloud gaming backend. The cloud gaming backend encodes the updated multimedia picture to obtain the corresponding updated multimedia data, and sends the updated multimedia data to the cloud gaming proxy. The cloud gaming proxy sends the updated multimedia data to the terminal. After receiving the updated multimedia data, the terminal decodes and displays the corresponding updated multimedia picture.

Figure 12:
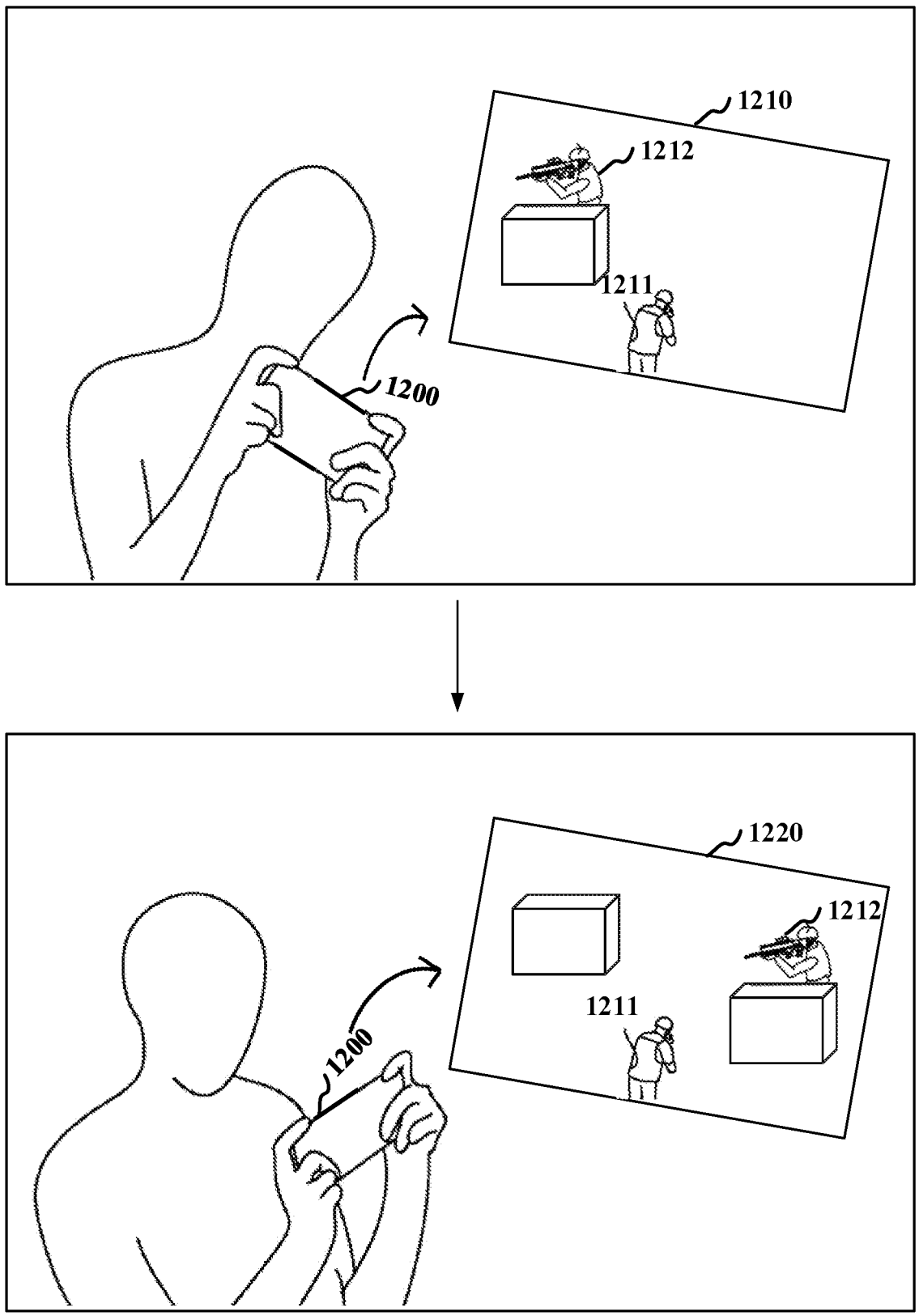
FIG. 12 is a schematic diagram of a picture update interface of a terminal according to an embodiment.

Referring to FIG. 12, a user holds a terminal 1200, and the terminal 1200 displays a game picture of a shooter game. The user has started a gyro sensor in a game configuration interface. Before the user changes the status of the terminal in a space, the terminal displays a multimedia picture 1210. The multimedia picture 1210 is a game picture that derives from observing, by a virtual object 1211, a virtual environment from a first viewing angle. The multimedia picture 1210 includes a target object 1212. When the user changes the status of the terminal in the space, for example, controls the terminal to rotate by an angle, the terminal 1200 switches the picture from the multimedia picture 1210 to an updated multimedia picture 1220. The updated multimedia picture 1220 is a game picture that derives from observing, by the virtual object 1211, the virtual environment from a second viewing angle. The updated multimedia picture 1220 includes the target object 1212. Because the viewing angle of the virtual object 1211 has changed, the position of the target object 1212 displayed in the game picture has also changed accordingly.

Figure 13:
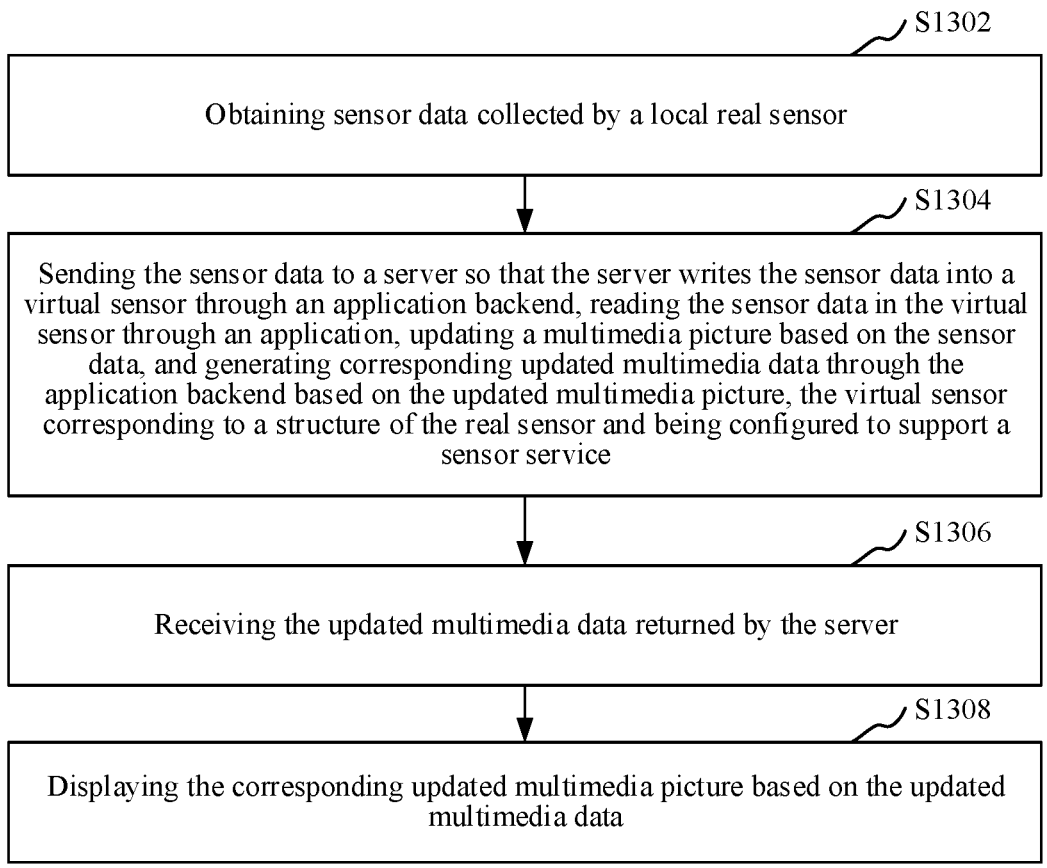
FIG. 13 is a schematic flowchart of a picture update method according to another embodiment.

In an embodiment, as shown in FIG. 13, a picture update method is provided. Using an example in which the method is applied to the terminal shown in FIG. 1, the method includes the following steps:

Step S1302: Obtaining sensor data collected by a local physical sensor.

Specifically, an application client may run on the terminal. The application client may display a list of applications that can be installed and run as currently supported by a server. The terminal may receive a trigger operation effectuated by the user on any application in the list of applications, and generate an application startup instruction based on the trigger operation. The application startup instruction is used for instructing the server to run an idle container in which the application is deployed. Then, the terminal can display an application picture corresponding to the application and sent by the server. The terminal may generate a virtual sensor startup instruction according to the user an application client, and send the virtual sensor startup instruction to the server. The virtual sensor startup instruction carries a sensor type identifier. After receiving the virtual sensor startup instruction, the server may start up a virtual sensor device corresponding to the sensor type identifier, and generate a corresponding physical sensor startup instruction. The physical sensor startup instruction carries the sensor type identifier. After receiving the physical sensor startup instruction, the terminal may start up a physical sensor corresponding to the sensor type identifier. Subsequently, when the user changes the status of the terminal in the space, the physical sensor may collect the corresponding sensor data.

Step S1304: Sending the sensor data to a server so that the server writes the sensor data into a virtual sensor through an application backend, reading the sensor data in the virtual sensor through an application, updating a multimedia picture based on the sensor data, and generating corresponding updated multimedia data through the application backend based on the updated multimedia picture. The virtual sensor corresponds to a structure of the physical sensor and is configured to support a sensor service.

Specifically, the terminal may send the sensor data to the server. A virtual sensor corresponding to the structure of the physical sensor is pre-constructed in the server. The virtual sensor can assist the server in starting up the sensor service. The server further contains an application and an application backend. After receiving the sensor data, the server may write the sensor data into the virtual sensor through the application backend, so that the sensor data is cached in the virtual sensor. The application in the server may invoke the sensor service to read the sensor data in the virtual sensor, determine viewing angle adjustment data based on the sensor data, and update, based on the viewing angle adjustment data, a multimedia picture corresponding to a current viewing angle. The application in the server sends the updated multimedia picture to the application backend in the server. The application backend generates, based on the updated multimedia picture, updated multimedia data corresponding to the target viewing angle. The target viewing angle is obtained by adjusting the current viewing angle based on the viewing angle adjustment data.

Understandably, for a specific process of data processing performed by the server, refer to the methods described in the foregoing related embodiments, and details are omitted herein.

Step S1306: Receiving the updated multimedia data returned by the server.

Step S1308: Displaying the corresponding updated multimedia picture based on the updated multimedia data.

Specifically, the terminal may receive the updated multimedia data returned by the server, and display the corresponding updated multimedia picture based on the updated multimedia data. In this way, the viewing angle can be adjusted based on the sensor data that derives from the user's changing the status of the terminal in the space, and the application picture observed from the adjusted viewing angle is displayed on the terminal.

In the foregoing picture update method, the sensor data collected by the local physical sensor is obtained. The sensor data is sent to the server so that the server writes the sensor data into the virtual sensor through the application backend. The sensor data in the virtual sensor is read through the application. The multimedia picture is updated based on the sensor data. Corresponding updated multimedia data is generated through the application backend based on the updated multimedia picture. The virtual sensor corresponds to the structure of the physical sensor and is configured to support a sensor service, receive the updated multimedia data returned by the server, and display the corresponding updated multimedia picture based on the updated multimedia data. In this way, the virtual sensor corresponding to the structure of the physical sensor is pre-constructed in the server. The virtual sensor may be configured to store the sensor data and support the sensor service. Therefore, in a scenario in which the application runs on a cloud server, even without a physical sensor, the server can still use the virtual sensor to start up the sensor service to control the physical sensor of the terminal. The server can read the sensor data in the virtual sensor, the sensor data being collected by the physical sensor as triggered by a user operation and is sent by the terminal. The server updates the multimedia picture based on the sensor data, and generates the corresponding updated multimedia data. After receiving the updated multimedia data, the terminal can display the multimedia picture corresponding to the updated multimedia data. Finally, in this scenario, the picture displayed by the application on the terminal can still be updated by the physical sensor by detecting a user operation on the terminal.

Understandably, although the steps in the flowchart are sequentially displayed as indicated by arrows, the steps are not necessarily performed in the order indicated by the arrows. Unless otherwise expressly specified herein, the order of performing the steps is not strictly limited, and the steps may be performed in other order. Moreover, at least a part of the steps in the flowchart may include a plurality of substeps or stages. The substeps or stages are not necessarily performed at the same time, but may be performed at different times. The substeps or stages are not necessarily performed sequentially, but may take turns or alternate with other steps or at least a part of substeps or stages of other steps.

Figure 14:
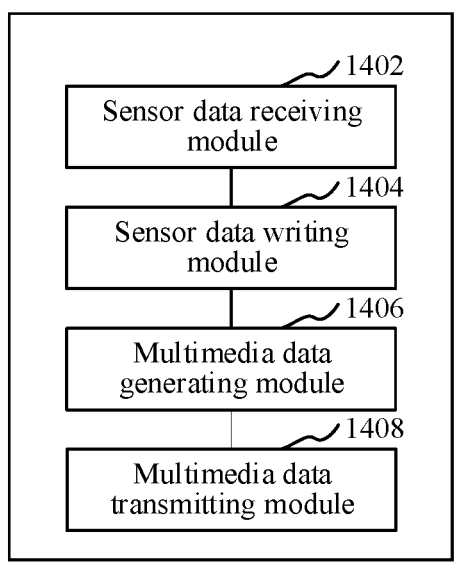
FIG. 14 is a structural block diagram of a picture update apparatus according to an embodiment.

In an embodiment, as shown in FIG. 14, a picture update apparatus is provided. The apparatus may adopt a software module or a hardware module or a combination thereof and may become a part of a computer device. The apparatus specifically includes: a sensor data receiving module 1402, a sensor data writing module 1404, a multimedia data generating module 1406, and a multimedia data transmitting module 1408.

The sensor data receiving module 1402 is configured to receive sensor data sent by a terminal. The sensor data is collected by a physical sensor of the terminal.

The sensor data writing module 1404 is configured to write the sensor data into a virtual sensor. The virtual sensor corresponds to a structure of the physical sensor and is configured to support a sensor service.

The multimedia data generating module 1406 is configured to read the sensor data in the virtual sensor, update a multimedia picture based on the sensor data, and generate corresponding updated multimedia data.

The multimedia data transmitting module 1408 is configured to return the updated multimedia data to the terminal, so that the terminal displays the corresponding updated multimedia picture based on the updated multimedia data.

In an embodiment, the picture update apparatus further includes:

a first instruction receiving module, configured to receive an application startup instruction sent by the terminal, the application startup instruction carrying a terminal identifier and an application identifier of the terminal; and a first instruction processing module, configured to obtain, based on the application startup instruction, a target container corresponding to the application identifier from an idle container pool, start up the target container, and correlate the target container with the terminal identifier.

In an embodiment, the sensor data carries the terminal identifier, and the sensor data receiving module is further configured to receive, by using an application proxy, the sensor data sent by the terminal, and input the sensor data into the target container based on the terminal identifier. The target container contains an application, a sensor service module, a virtual sensor, and an application backend. The sensor service module is configured to provide the sensor service. The application backend is configured to receive the sensor data input by the application proxy, and write the sensor data into the virtual sensor. The application is configured to invoke the sensor service module to read the sensor data in the virtual sensor, update the multimedia picture based on the sensor data, and send the updated multimedia picture to the application backend. The application backend is further configured to generate the corresponding updated multimedia data based on the updated multimedia picture, and send the updated multimedia data to the terminal through the application proxy.

In an embodiment, the virtual sensor includes a virtual sensor abstraction layer and a shared memory. The virtual sensor abstraction layer is configured to provide a virtual sensor list and a sensor interface. The shared memory is configured to generate a virtual sensor device.

In an embodiment, the picture update apparatus further includes:

a second instruction receiving module, configured to receive a virtual sensor control instruction sent by the terminal, the virtual sensor control instruction carrying a sensor type identifier;

a second instruction processing module, configured to update, based on the virtual sensor control instruction, switch status of a target virtual sensor device corresponding to a sensor type identifier through a virtual sensor abstraction layer, so as to obtain current switch status of the target virtual sensor device; and an instruction transmitting module, configured to generate a physical sensor control instruction based on the current switch status of the target virtual sensor device, and return the physical sensor control instruction to the terminal, so that the terminal synchronizes the switch status for a target physical sensor corresponding to the target virtual sensor device based on the current switch status.

In an embodiment, the second instruction processing module is further configured to invoke a sensor creation function in the virtual sensor abstraction layer through a sensor service based on the virtual sensor control instruction; and generate a sensor interface and a shared memory based on the sensor creation function.

In an embodiment, the second instruction processing module is further configured to invoke, when the virtual sensor list includes the sensor type identifier, the sensor interface through the sensor service to update the switch status of the target virtual sensor device, so as to obtain current switch status of the target virtual sensor device; and write the current switch status of the target virtual sensor device into a current switch status statistics list in the shared memory. The current switch status statistics list includes the current switch status of a plurality of virtual sensor devices.

In an embodiment, the instruction transmitting module is further configured to: read the current switch status statistics list in the shared memory, and generate a corresponding physical sensor control instruction, the physical sensor control instruction carrying the current switch status statistics list; return the physical sensor control instruction to the terminal, so that the terminal obtains a historical switch status statistics list based on the physical sensor control instruction, and updates the switch status of the corresponding target physical sensor based on a difference between the historical switch status statistics list and the current switch status statistics list.

In an embodiment, the sensor data writing module is further configured to write the sensor data into a tail of the queue in the shared memory, and update a tail identifier. The multimedia data generating module is further configured to read the sensor data at a head of the queue, and update a head identifier.

In an embodiment, the multimedia data generating module is further configured to obtain a preset rollback threshold when a number of items of the sensor data written into the virtual sensor is greater than a preset write threshold; update the head identifier based on the preset rollback threshold to obtain a target head identifier; use the sensor data between the target head identifier and the tail identifier in the queue as target sensor data; and update the multimedia picture based on the target sensor data, and generate the corresponding updated multimedia data.

In an embodiment, the multimedia data generating module is further configured to: obtain a panoramic picture, the multimedia picture being a picture that matches a first viewing angle in the panoramic picture, and the first viewing angle being a current viewing angle; adjust the first viewing angle based on the sensor data to obtain a second viewing angle; and determine a picture that matches the second viewing angle in the panoramic picture, generate corresponding multimedia viewing angle update data, and use the multimedia viewing angle update data as the updated multimedia data. The multimedia data transmitting module is further configured to return the multimedia viewing angle update data to the terminal, so that the terminal switches, based on the multimedia viewing angle update data, a currently displayed picture from the picture corresponding to the first viewing angle to the picture corresponding to the second viewing angle.

Figure 15:
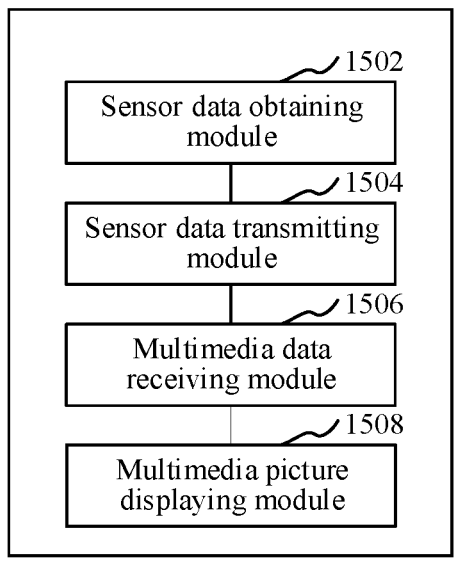
FIG. 15 is a structural block diagram of a picture update apparatus according to another embodiment.

In an embodiment, as shown in FIG. 15, a picture update apparatus is provided. The apparatus may adopt a software module or a hardware module or a combination thereof and may become a part of a computer device. The apparatus specifically includes: a sensor data obtaining module 1502, a sensor data transmitting module 1504, a multimedia data receiving module 1506, and a multimedia picture displaying module 1508.

The sensor data obtaining module 1502 is configured to obtain sensor data collected by a local physical sensor.

The sensor data transmitting module 1504 is configured to send the sensor data to a server so that the server writes the sensor data into a virtual sensor through an application backend, read the sensor data in the virtual sensor through an application, update a multimedia picture based on the sensor data, and generate corresponding updated multimedia data through the application backend based on the updated multimedia picture. The virtual sensor corresponds to a structure of the physical sensor and is configured to support a sensor service.

The multimedia data receiving module 1506 is configured to receive the updated multimedia data returned by the server.

The multimedia picture displaying module 1508 is configured to display the corresponding updated multimedia picture based on the updated multimedia data.

For a specific limitation on the picture update apparatus, refer to the limitation on the picture update method above, details of which are omitted herein. The modules in the picture update apparatus may be implemented entirely or partially by software, hardware, or a combination thereof. The modules may be built in a processor of a computer device in hardware form or independent of the processor, or may be stored in a memory of the computer device in software form, so as to be invoked by the processor to perform the corresponding operations.

In an embodiment, a computer device is provided. The computer device may be a server, and an internal structure diagram of the computer device may be shown in FIG. 16. The computer device includes a processor, a memory, and a network interface that are connected by a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is used for storing a plurality of containers, sensor data, and the like. The network interface of the computer device is configured to communicate with an external terminal through a network connection. When executed by a processor, the computer-readable instruction implements a picture update method.

In an embodiment, a computer device is provided. The computer device may be a terminal. An internal structure diagram of the computer device may be shown in FIG. 17. The computer device includes a processor, a memory, a communications interface, a display screen, and an input apparatus that are connected by a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The communications interface of the computer device is configured to communicate with an external terminal in a wired or wireless manner. The wireless communication may be implemented by WIFI, an operator network, near field communication (NFC), or other technologies. When executed by a processor, the computer-readable instruction implements a picture update method. The display screen of the computer device may be a liquid crystal display or an electronic ink display screen. The input device of the computer device may be a touch layer that overlays the display screen, or may be a key, a trackball, or a touchpad disposed on the chassis of the computer device, or may be an external keyboard, touchpad or mouse or the like.

Figure 16:
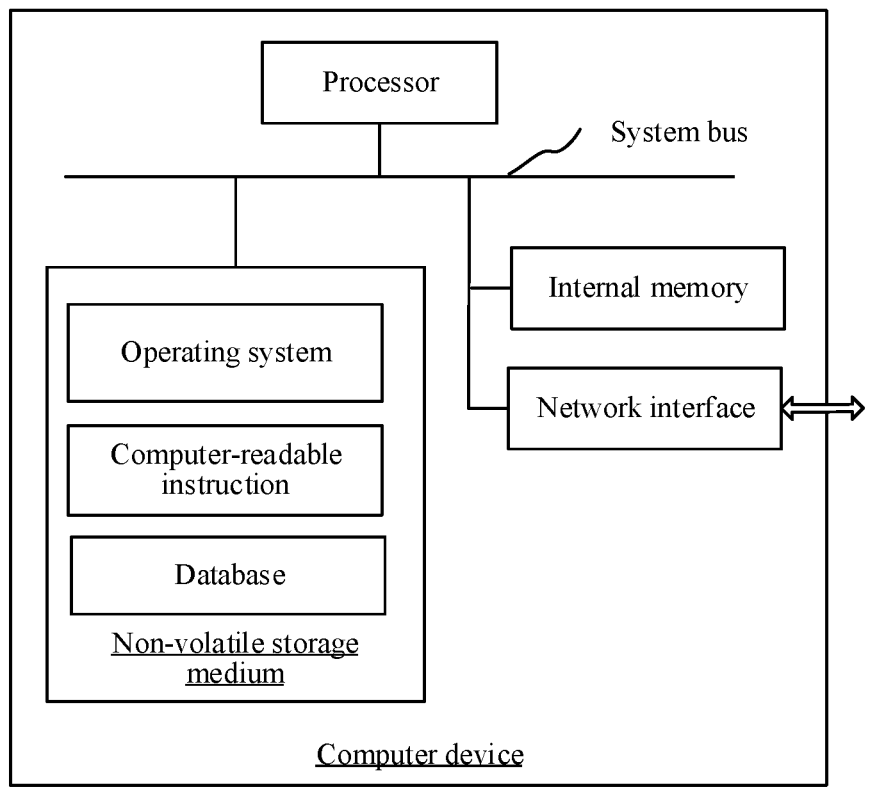
FIG. 16 is an internal structure diagram of a computer device according to an embodiment.
Figure 17:
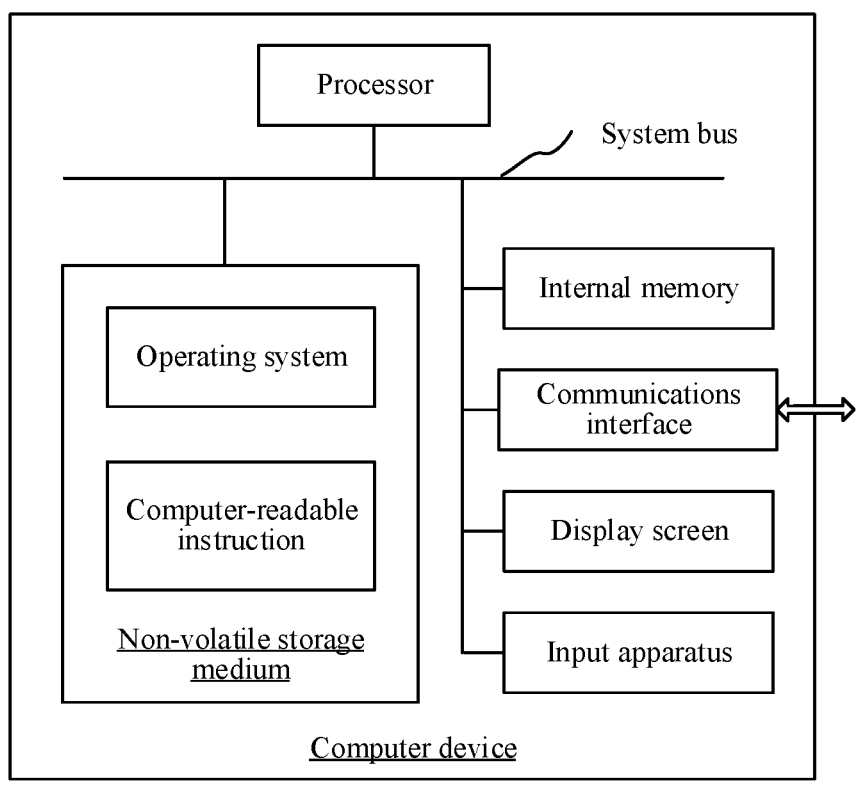
FIG. 17 is an internal structure diagram of a computer device according to an embodiment.

A person skilled in the art may understand that the structures shown in FIG. 16 and FIG. 17 are block diagrams of just a part of structures related to the solution of this application, and do not constitute any limitation on the computer device to which the solution of this application is applied. A specific computer device may include more or fewer components than those shown in the drawings, or may include a combination of some of the components, or may arrange the components in a different way.

In an embodiment, a computer device is provided, including a memory and one or more processors. The memory stores a computer-readable instruction. When executing the computer-readable instruction, the one or more processors implement steps of the method embodiments described above.

In an embodiment, one or more non-volatile computer-readable storage media storing a computer-readable instruction are provided. When executed by one or more processors, the computer-readable instruction implements steps of the method embodiments described above.

In an embodiment, a computer program product or a computer program is provided. The computer program product or the computer program includes a computer-readable instruction. The computer-readable instruction is stored in a computer-readable storage medium. The processor of the computer device reads the computer-readable instruction from the computer-readable storage medium. The processor executes the computer-readable instruction to cause the computer device to perform the steps of the method embodiments.

A person of ordinary skill in the art may understand that all or some of the procedures of the methods according to the embodiments above may be implemented by relevant hardware instructed by a computer-readable instruction. The computer-readable instruction may be stored in a non-volatile computer-readable storage medium. When executed, the computer-readable instruction may perform steps including the procedures according to the embodiments of the methods. Any reference to a memory, a storage, a database, or another medium used in the embodiments provided in this application may include at least one of a non-volatile memory or a volatile memory. The non-volatile memory may include a read-only memory (ROM), a magnetic tape, a floppy disk, a flash memory, an optical memory, or the like. The volatile memory may include a random access memory (RAM) or an external cache. Illustratively rather than restrictively, the RAM is in diverse forms, such as a static random access memory (SRAM) or a (DRAM).

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The technical features in the foregoing embodiments may be combined arbitrarily. For brevity, not all possible combinations of the technical features in the embodiments are described. However, to the extent that no conflict exists, all such combinations of the technical features are considered falling within the scope hereof.

The foregoing embodiments merely describe several implementations of this application. The description goes to details, but is in no way to be thereby understood as a limitation on the patent scope hereof. Several variations and improvements, which may be made to the embodiments by a person of ordinary skill in the art without departing from the concept of this application, fall within the protection scope of this application. Therefore, the protection scope of this application is subject to the claims appended hereto.

What is claimed is:

1. A picture update method performed by a server, wherein the server receives a panoramic picture from a terminal and determines a multimedia picture in the panoramic picture based on a currently displayed picture on the terminal, the method comprising:
   receiving, at the server, sensor data sent by the terminal, the sensor data being collected by a physical sensor of the terminal;
   writing, by the server, the sensor data into a virtual sensor at the server, the virtual sensor corresponding to a structure of the physical sensor and having a memory shared with the physical sensor, and the virtual sensor is configured to store the sensor data in the shared memory using a sensor interface to support a sensor service associated with the physical sensor;
   determining a first viewing angle corresponding to the currently displayed picture on the terminal;
   determining a second viewing angle based on the sensor data stored in the shared memory;
   determining a picture that matches the second viewing angle in the panoramic picture;
   generating multimedia viewing angle update data based on the first viewing angle and the second viewing angle; and
   returning the multimedia viewing angle update data to the terminal, wherein the terminal is configured to update, based on the multimedia viewing angle update data, the currently displayed picture corresponding to the first viewing angle to the picture corresponding to the second viewing angle.

2. The method according to claim 1, wherein the method further comprises:
prior to receiving sensor data sent by the terminal:
receiving, at the server, an application startup instruction sent by the terminal, wherein the application startup instruction includes a terminal identifier and an application identifier of an application triggered at the terminal; and
obtaining, based on the application startup instruction, a target container corresponding to the application identifier from an idle container pool, starting up the target container, and correlating the target container with the terminal identifier.

3. The method according to claim 2, wherein the sensor data carries the terminal identifier, and receiving the sensor data sent by the terminal comprises:
receiving, using an application proxy at the server, the sensor data sent by the terminal, and inputting the sensor data into the target container based on the terminal identifier, the target container containing an application corresponding to the application identifier, a sensor service module, the virtual sensor, and an application backend, and the sensor service module being configured to provide the sensor service associated with the physical sensor;
the application backend is configured to receive the sensor data input by the application proxy, and write the sensor data into the virtual sensor;
the application is configured to invoke the sensor service module to read the sensor data in the virtual sensor, update the multimedia picture based on the sensor data, and transmit the updated multimedia picture to the application backend; and
the application backend is further configured to generate the corresponding updated multimedia data based on the updated multimedia picture, and transmit the updated multimedia data to the terminal through the application proxy.

4. The method according to claim 1, wherein the virtual sensor comprises a virtual sensor abstraction layer and a shared memory, the virtual sensor abstraction layer is configured to provide a virtual sensor list and a sensor interface, and the shared memory is configured to generate a virtual sensor device.

5. The method according to claim 4, wherein the method further comprises:
prior to receiving sensor data sent by the terminal:
receiving a virtual sensor control instruction sent by the terminal, wherein the virtual sensor control instruction includes a sensor type identifier;
updating, based on the virtual sensor control instruction, switch status of a target virtual sensor device corresponding to the sensor type identifier through the virtual sensor abstraction layer, so as to obtain current switch status of the target virtual sensor device; and
generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status.

6. The method according to claim 5, wherein the method further comprises:
after receiving the virtual sensor control instruction sent by the terminal:
invoking a sensor creation function in the virtual sensor abstraction layer through the sensor service based on the virtual sensor control instruction; and
generating the sensor interface and the shared memory based on the sensor creation function.

7. The method according to claim 5, wherein updating, based on the virtual sensor control instruction, switch status of a target virtual sensor device corresponding to the sensor type identifier through the virtual sensor abstraction layer, so as to obtain current switch status of the target virtual sensor device, comprises:
invoking, when the virtual sensor list comprises the sensor type identifier, the sensor interface through the sensor service to update the switch status of the target virtual sensor device, so as to obtain current switch status of the target virtual sensor device; and
writing the current switch status of the target virtual sensor device into a current switch status statistics list in the shared memory, the current switch status statistics list comprising the current switch status of a plurality of virtual sensor devices.

8. The method according to claim 7, wherein generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status, comprise:
reading the current switch status statistics list in the shared memory, and generating a corresponding physical sensor control instruction, wherein the physical sensor control instruction includes the current switch status statistics list; and
returning the physical sensor control instruction to the terminal, so that the terminal obtains a historical switch status statistics list based on the physical sensor control instruction, and updates the switch status of the corresponding target physical sensor based on a difference between the historical switch status statistics list and the current switch status statistics list.

9. The method according to claim 4, wherein writing the sensor data into a virtual sensor comprises:
writing the sensor data into a tail of a queue in the shared memory, and updating a tail identifier associated with the tail of the queue; and
reading the sensor data in the virtual sensor comprises:
reading the sensor data at a head of the queue, and updating a head identifier associated with the head of the queue.

10. The method according to claim 9, wherein reading the sensor data in the virtual sensor, updating a multimedia picture based on the sensor data, and generating corresponding updated multimedia data, comprise:
obtaining a preset rollback threshold when a number of items of the sensor data written into the virtual sensor is greater than a preset write threshold;
updating the head identifier based on the preset rollback threshold to obtain a target head identifier;
using the sensor data between the target head identifier and the tail identifier in the queue as target sensor data; and updating the multimedia picture based on the target sensor data, and generating the corresponding updated multimedia data.

11. A server, comprising a memory and one or more processors, the memory storing a computer-readable instruction; and, when executed by the one or more processors, the computer-readable instruction causing the one or more processors to implement operations of a picture update method performed by the server, wherein the server receives a panoramic picture from a terminal and determines a multimedia picture in the panoramic picture based on a currently displayed picture on the terminal, the method including:

receiving, at the server, sensor data sent by a terminal, the sensor data being collected by a physical sensor of the terminal;

writing, by the server, the sensor data into a virtual sensor at the server, the virtual sensor corresponding to a structure of the physical sensor and having a memory shared with the physical sensor, and the virtual sensor is configured to store the sensor data in the shared memory using a sensor interface to support a sensor service associated with the physical sensor;

determining a first viewing angle corresponding to the currently displayed picture on the terminal;

determining a second viewing angle based on the sensor data stored in the shared memory;

determining a picture that matches the second viewing angle in the panoramic picture;

generating multimedia viewing angle update data based on the first viewing angle and the second viewing angle; and returning the multimedia viewing angle update data to the terminal, wherein the terminal is configured to update, based on the multimedia viewing angle update data, the currently displayed picture corresponding to the first viewing angle to the picture corresponding to the second viewing angle.

12. The server according to claim 11, wherein, prior to receiving sensor data sent by the terminal, the server is configured to:

receive, at the server, an application startup instruction sent by the terminal, wherein the application startup instruction includes a terminal identifier and an application identifier of an application triggered at the terminal; and obtain, based on the application startup instruction, a target container corresponding to the application identifier from an idle container pool, starting up the target container, and correlating the target container with the terminal identifier.

13. The server according to claim 11, wherein the sensor data carries the terminal identifier, and receiving the sensor data sent by the terminal comprises:

receiving, using an application proxy at the server, the sensor data sent by the terminal, and inputting the sensor data into the target container based on the terminal identifier, the target container containing an application corresponding to the application identifier, a sensor service module, the virtual sensor, and an application backend, and the sensor service module being configured to provide the sensor service associated with the physical sensor;

the application backend is configured to receive the sensor data input by the application proxy, and write the sensor data into the virtual sensor;

the application is configured to invoke the sensor service module to read the sensor data in the virtual sensor, update the multimedia picture based on the sensor data, and transmit the updated multimedia picture to the application backend; and the application backend is further configured to generate the corresponding updated multimedia data based on the updated multimedia picture, and transmit the updated multimedia data to the terminal through the application proxy.

14. The server according to claim 11, wherein the virtual sensor comprises a virtual sensor abstraction layer and a shared memory, the virtual sensor abstraction layer is configured to provide a virtual sensor list and a sensor interface, and the shared memory is configured to generate a virtual sensor device.

15. The server according to claim 14, wherein, prior to receiving sensor data sent by the terminal, the server is configured to:

receive a virtual sensor control instruction sent by the terminal, wherein the virtual sensor control instruction includes a sensor type identifier;

update, based on the virtual sensor control instruction, switch status of a target virtual sensor device corresponding to the sensor type identifier through the virtual sensor abstraction layer, so as to obtain current switch status of the target virtual sensor device; and generate a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status.

16. A non-transitory computer-readable storage medium, storing one or more computer programs, the computer programs, when executed by a processor of a server, cause the server to perform a picture update method performed by the server, wherein the server receives a panoramic picture from a terminal and determines a multimedia picture in the panoramic picture based on a currently displayed picture on the terminal, the method including:

receiving, at the server, sensor data sent by a terminal, the sensor data being collected by a physical sensor of the terminal;

writing, by the server, the sensor data into a virtual sensor at the server, the virtual sensor corresponding to a structure of the physical sensor and having a memory shared with the physical sensor, and the virtual sensor is configured to store the sensor data in the shared memory using a sensor interface to support a sensor service associated with the physical sensor;

determining a first viewing angle corresponding to the currently displayed picture on the terminal;

determining a second viewing angle based on the sensor data stored in the shared memory;

determining a picture that matches the second viewing angle in the panoramic picture;

generating multimedia viewing angle update data based on the first viewing angle and the second viewing angle; and returning the multimedia viewing angle update data to the terminal, wherein the terminal is configured to update, based on the multimedia viewing angle update data, the currently displayed picture corresponding to the first viewing angle to the picture corresponding to the second viewing angle.

17. The non-transitory computer storage medium according to claim 16, wherein the picture update method further comprises: prior to receiving sensor data sent by the terminal:
- receiving, at the server, an application startup instruction sent by the terminal, wherein the application startup instruction includes a terminal identifier and an application identifier of the application triggered at the terminal; and
- obtaining, based on the application startup instruction, a target container corresponding to the application identifier from an idle container pool, starting up the target container, and correlating the target container with the terminal identifier.

18. The non-transitory computer storage medium according to claim 16, wherein the virtual sensor comprises a virtual sensor abstraction layer and a shared memory, the virtual sensor abstraction layer is configured to provide a virtual sensor list and a sensor interface, and the shared memory is configured to generate a virtual sensor device.

19. The non-transitory computer storage medium according to claim 18, the picture update method further comprises:
prior to receiving sensor data sent by the terminal:
- receiving a virtual sensor control instruction sent by the terminal, wherein the virtual sensor control instruction includes a sensor type identifier;
- updating, based on the virtual sensor control instruction, switch status of a target virtual sensor device corresponding to the sensor type identifier through the virtual sensor abstraction layer, so as to obtain current switch status of the target virtual sensor device; and
- generating a physical sensor control instruction based on the current switch status of the target virtual sensor device, and returning the physical sensor control instruction to the terminal, so that the terminal synchronizes the switch status for a target physical sensor corresponding to the target virtual sensor device based on the current switch status.

* * * * *